US012755878B2

(12) United States Patent
Johnson et al.

(10) Patent No.: US 12,755,878 B2
(45) Date of Patent: Oct. 6, 2026

(54) ANISOTROPIC IRON NITRIDE PERMANENT MAGNETS

(71) Applicant: NIRON MAGNETICS, INC., Minneapolis, MN (US)

(72) Inventors: Francis Johnson, Minneapolis, MN (US); Richard W. Greger, Saint Paul, MN (US); John Michael Larson, Northfield, MN (US); Yiming Wu, Shorview, MN (US); Fan Zhang, Saint Paul, MN (US); Kathryn Sara Damien, Minneapolis, MN (US)

(73) Assignee: Niron Magnetics, Inc., Minneapolis, MN (US)

( * ) Notice: Subject to any disclaimer, the term of this patent is extended or adjusted under 35 U.S.C. 154(b) by 315 days.

(21) Appl. No.: 18/489,568

(22) Filed: Oct. 18, 2023

(65) Prior Publication Data

US 2024/0047102 A1 Feb. 8, 2024

Related U.S. Application Data

(60) Division of application No. 17/718,517, filed on Apr. 12, 2022, now Pat. No. 11,830,644, which is a (Continued)

(51) Int. Cl.

*H01F 1/047* (2006.01)
*H01F 1/00* (2006.01)
(Continued)

(52) U.S. Cl.

CPC ........... *H01F 1/047* (2013.01); *H01F 1/0045* (2013.01); *H01F 1/065* (2013.01); *H01F 1/442* (2013.01);
(Continued)

(58) Field of Classification Search

CPC ........ H01F 1/047; H01F 1/0045; H01F 1/065; H01F 1/442; H01F 41/0273; C01P 2004/64
(Continued)

(56) References Cited

U.S. PATENT DOCUMENTS

| | | | |
|---|---|---|---|
| 6,319,485 | B1 | 11/2001 | Nagatomi et al. |
| 9,715,957 | B2 | 7/2017 | Wang et al. |

(Continued)

FOREIGN PATENT DOCUMENTS

| | | |
|---|---|---|
| CN | 103493154 A | 1/2014 |
| CN | 107396631 A | 11/2017 |

(Continued)

OTHER PUBLICATIONS

Jiang et al.; "A method to evaluate α"-Fe16N2 volume ratio in FeN bulk material by XPS"; Materials Research Express; vol. 2; 2015.

*Primary Examiner* — Danielle M. Carda
(74) *Attorney, Agent, or Firm* — BakerHostetler

(57) ABSTRACT

Disclosed herein is a permanent magnet comprising: a plurality of aligned iron nitride nanoparticles wherein the iron nitride nanoparticles include α"-$Fe_{16}N_2$ phase domains; wherein a ratio of integrated intensities of an α"-$Fe_{16}N_2$ (004) x-ray diffraction peak to an α"-α"-$Fe_{16}N_2$ (202) x-ray diffraction peak for the aligned iron nitride nanoparticles is greater than at least 7%, wherein the diffraction vector is parallel to alignment direction, and wherein the iron nitride nanoparticles exhibit a squareness measured parallel to the alignment direction that is greater than a squareness measured perpendicular to the alignment direction.

20 Claims, 19 Drawing Sheets

Related U.S. Application Data continuation of application No. 17/182,066, filed on Feb. 22, 2021, now Pat. No. 11,309,107.

(60) Provisional application No. 63/080,144, filed on Sep. 18, 2020, provisional application No. 62/979,668, filed on Feb. 21, 2020.

(51) Int. Cl.

| | |
|---|---|
| ***H01F 1/06*** | (2006.01) |
| ***H01F 1/44*** | (2006.01) |
| ***H01F 41/02*** | (2006.01) |

(52) U.S. Cl.
CPC ...... *H01F 41/0273* (2013.01); *C01P 2004/64* (2013.01)

(58) Field of Classification Search
USPC .......................................................... 148/101
See application file for complete search history.

(56) References Cited

U.S. PATENT DOCUMENTS

| | | | |
|---|---|---|---|
| 9,994,949 | B2 | 6/2018 | Brady et al. |
| 10,961,615 | B2 | 3/2021 | Brady et al. |
| 11,161,175 | B2 | 11/2021 | Wang et al. |
| 2014/0001398 | A1 | 1/2014 | Takahashi et al. |
| 2015/0147217 | A1 | 5/2015 | Johnson et al. |
| 2015/0380135 | A1 | 12/2015 | Wang et al. |
| 2016/0244581 | A1 | 8/2016 | Brink et al. |
| 2017/0186518 | A1 | 6/2017 | Wang et al. |
| 2017/0186521 | A1 | 6/2017 | Nakamura et al. |
| 2017/0243680 | A1 | 8/2017 | Wang et al. |
| 2017/0365381 | A1 | 12/2017 | Wang et al. |
| 2018/0001385 | A1 | 1/2018 | Wang et al. |
| 2018/0025841 | A1 | 1/2018 | Wang et al. |
| 2018/0226180 | A1 | 8/2018 | Kawashita et al. |
| 2020/0038951 | A1* | 2/2020 | Wang ...................... H01F 1/065 |
| 2020/0243231 | A1 | 7/2020 | Sasaguri et al. |
| 2021/0180174 | A1 | 6/2021 | Brady et al. |

FOREIGN PATENT DOCUMENTS

| | | | |
|---|---|---|---|
| CN | 107408435 | A | 11/2017 |
| CN | 110073448 | A | 7/2019 |
| JP | 2007-335592 | A | 12/2007 |
| JP | 2009-249682 | A | 10/2009 |
| JP | 2011-129172 | A | 6/2011 |
| JP | 2012-231098 | A | 11/2012 |
| JP | 2013-080922 | A | 5/2013 |
| JP | 2016-513365 | A | 5/2016 |
| JP | 2016-134582 | A | 7/2016 |
| JP | 2017-517630 | A | 6/2017 |
| JP | 2018-509756 | A | 4/2018 |
| JP | 2018-509759 | A | 4/2018 |
| JP | 2018-510498 | A | 4/2018 |
| WO | WO 2010/058801 | A1 | 5/2010 |
| WO | WO 2014/210027 | A1 | 12/2014 |
| WO | WO 2016/122712 | A1 | 8/2016 |
| WO | WO 2018/067926 | A1 | 4/2018 |
| WO | WO 2018/204800 | A1 | 11/2018 |

* cited by examiner

ANISOTROPIC IRON NITRIDE PERMANENT MAGNETS

CROSS-REFERENCE TO RELATED APPLICATIONS

This patent application is a divisional of U.S. patent application Ser. No. 17/718,517, filed on Apr. 12, 2022, which is a continuation of U.S. patent application Ser. No. 17/182,066, filed on Feb. 22, 2021, which claims priority to U.S. Provisional Application No. 62/979,668, filed on Feb. 21, 2020, and U.S. Provisional Application No. 63/080,144, filed on Sep. 18, 2020. The entire disclosure of each application is incorporated by reference herein for all purposes.

FIELD OF THE INVENTION

The disclosed inventions are in the field of iron nitride magnetic materials.

BACKGROUND OF THE INVENTION

Permanent magnets can provide high efficiency and reliability for renewable energy technologies. Rare earth permanent magnets are generally encumbered by supply constraints and high prices. Novel magnets formed from more abundant and less strategically important elements are desired to replace rare earth magnets; materials including $\alpha''$-$Fe_{16}N_2$ are desirable candidates for such "rare-earth-free" magnets.

Permanent nanocomposite magnets may be produced from individual nanoparticles by consolidation. A binder may be used that fixes the nanoparticles in a matrix. If the nanoparticles have sufficiently large magnetic anisotropy, an external force may be used to align the nanoparticles prior to and/or during consolidation. However, electrostatic and electromagnetic forces generally combine to cause nanoparticles to form agglomerates that are typically porous, relatively large clusters of nanoparticles. These agglomerates may hinder the ability of individual nanoparticles to rotate in response to an external alignment force.

Thus, there remains a need for rare-earth-free permanent anisotropic magnetic materials that overcome the tendency of nanoparticles to agglomerate during processing for making rare-earth free magnets. The disclosed inventions are directed to these and other important needs.

SUMMARY

In various examples, the disclosure describes permanent magnets comprising a plurality of aligned iron nitride nanoparticles. The aligned iron nitride nanoparticles may include $\alpha''$-$Fe_{16}N_2$ phase domains. The iron nitride nanoparticles may exhibit a ratio of integrated intensities of an $\alpha''$-$Fe_{16}N_2$ (004) x-ray diffraction peak to an $\alpha''$-$Fe_{16}N_2$ (202) x-ray diffraction peak for the aligned iron nitride nanoparticles is greater than at least 7%, where the diffraction vector is parallel to alignment direction. Furthermore, the iron nitride nanoparticles may exhibit a squareness measured parallel to the alignment direction that is greater than a squareness measured perpendicular to the alignment direction.

This disclosure also describes dispersions comprising the disclosed iron nitride nanoparticles and a suitable solvent.

Moreover, the present disclosure describes nanocomposites comprising the disclosed iron nitride nanoparticles and a suitable binder.

In addition, the disclosure describes workpieces including the anisotropic iron nitride nanoparticles made by any of the techniques described herein. Workpieces may take a number of forms, such as a wire, rod, tape, bar, conduit, hollow conduit, film, sheet, or fiber, each of which may have a wide variety of cross-sectional shapes and sizes, as well as any combinations thereof.

Methods of forming the disclosed iron nitride nanoparticles and articles comprised thereof are further described herein.

The general description and the following detailed description are exemplary and explanatory only and are not restrictive of the invention, as defined in the appended claims. Other aspects of the present invention will be apparent to those skilled in the art in view of the detailed description of the invention as provided herein. The details of one or more examples are set forth in the accompanying drawings and the description below. Other features, objects, and advantages will be apparent from the description and drawings, and from the claims.

BRIEF DESCRIPTION OF DRAWINGS

The summary, as well as the following detailed description, is further understood when read in conjunction with the appended drawings. For the purpose of illustrating the invention, there are shown in the drawings exemplary embodiments of the invention; however, the disclosure is not limited to the specific methods, compositions, and devices disclosed. In addition, the drawings are not necessarily drawn to scale. In the drawings.

DETAILED DESCRIPTION OF ILLUSTRATIVE EMBODIMENTS

Figure 1:
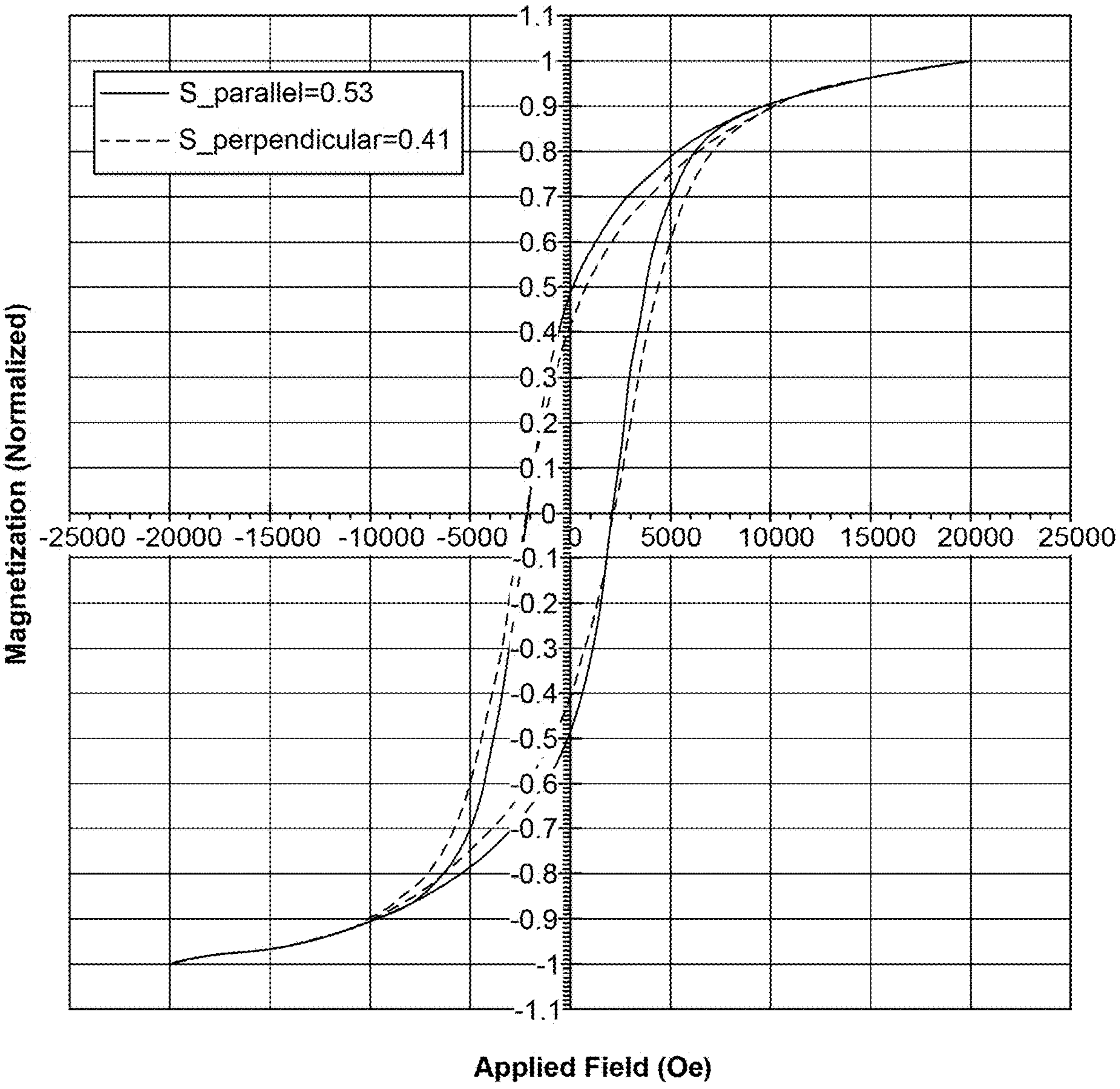
FIG. 1 presents the hysteresis loops measured on sample S5. The measurements were made in directions both parallel to (solid line) and perpendicular to (dashed line) the alignment field direction.

The present disclosure may be understood more readily by reference to the following detailed description taken in connection with the accompanying figures and examples, which form a part of this disclosure. It is to be understood that this disclosure is not limited to the specific devices, methods, applications, conditions or parameters described and/or shown herein, and that the terminology used herein is for the purpose of describing particular examples and is not intended to be limiting of the claims. When a range of values is expressed, another example includes from the one particular value and/or to the other particular value. Similarly, when values are expressed as approximations, by use of the antecedent "about," it will be understood that the particular value forms another example. All ranges are inclusive and combinable. Further, a reference to values stated in a range includes each and every value within that range.

It is to be appreciated that certain features of the disclosure which are, for clarity, described herein in the context of separate examples, may also be provided in combination in a single example. Conversely, various features of the disclosure that are, for brevity, described in the context of a single example, may also be provided separately or in any sub-combination.

It is also to be understood that the terminology used herein is for the purpose of describing particular aspects only and is not intended to be limiting. As used in the specification and in the claims, the term "comprising" can include the embodiments "consisting of" and "consisting essentially of" Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a thermoplastic polymer component" includes mixtures of two or more thermoplastic polymer components. As used herein, the term "combination" is inclusive of blends, mixtures, alloys, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optional additional processes" means that the additional processes can or cannot be included and that the description includes methods that both include and that do not include the additional processes.

Iron nitride nanoparticles can be conveniently produced by controlled reduction and nitriding of iron oxide nanoparticle precursors. Iron oxide nanoparticle precursors can be produced by a variety of means and are typically supplied as dried powders comprised of clumps of agglomerated nanoparticles. In a low temperature processing route, iron oxide nanoparticle agglomerates can be first reduced to elemental iron by annealing in a hydrogen containing atmosphere to produce iron nanoparticles. The iron nanoparticles can then transformed to iron nitride by annealing in an ammonia atmosphere. Optionally, a passivation treatment can be provided in which the iron nitride nanoparticles are coated with a thin layer of a stable metal oxide. These process steps produce isotropic agglomerates of iron nitride nanoparticles that are characterized by high saturation magnetization and moderate coercivity. This combination of magnetic properties makes iron nitride nanoparticles useful as a component of a permanent magnet.

Aligned Nanoparticles and Permanent Magnets Formed Therefrom

Permanent nanocomposite magnets may be produced from individual nanoparticles via a suitable consolidation process. Where the nanoparticles have a sufficiently large magnetic anisotropy, an external force may be used to align the nanoparticles prior to and/or during consolidation. However, electrostatic and electromagnetic forces generally combine to cause nanoparticles to form agglomerates that are typically porous clusters of nanoparticles that can be hundreds of microns in diameter. It is thus difficult to deagglomerate the nanoparticles to the extent needed to provide the individual nanoparticles the ability to rotate in response to an externally applied alignment force. Furthermore, the deagglomeration process raises the specific surface area of the assembly of nanoparticles. This increase in surface area may result in more reactive nanoparticles, which are, in turn, more susceptible to oxidation, decomposition, and re-sintering prior to alignment. Accordingly, these nanoparticles are not aligned, and when consolidated may form an isotropic nanocomposite permanent magnet.

Isotropic nanocomposite permanent magnets have low energy product and remnant magnetization, which is attributed to a low squareness. As these conventional nanoparticle agglomerates are isotropic, they are unable to be aligned with an external force resulting in the described low remnant magnetization and low squareness. The aligned nanocomposite permanent magnet of the present disclosure may overcome the tendency of nanoparticles to form randomly oriented agglomerates. As such, the present disclosure provides anisotropic nanocomposite permanent magnets that exhibit enhanced squareness.

According to various aspects, anisotropic nanocomposite permanent magnets may be formed by aligning the nanoparticles that comprise the nanocomposite. The anisotropy of the resulting nanocomposite is thus the volume weighted average of the anisotropy of each constituent nanoparticle and the nanocomposite will have a preferred orientation of its magnetization vector. The nanocomposite's remnant magnetization is the sum of the projections of each nanoparticle's magnetization vector onto the preferred orientation vector. As such, the disclosed nanocomposite may overcome the inherent tendency of magnetic nanoparticles to form agglomerates of multiple, randomly oriented nanoparticles.

In various aspects, the present disclosure provides a permanent magnet comprising a plurality of aligned iron nitride nanoparticles. Such permanent magnets provide a high energy product and feature preferred magnetization directions of each individual nanoparticle or grain that comprises the magnet's microstructure. This results in the remnant magnetization (Mr) of the magnet being a large fraction of the magnet's saturation magnetization (MSat). The ratio of the remnant magnetization to the saturation magnetization (Mr/MSat) is defined as the squareness (S). A permanent magnet may be considered anisotropic if the value of the squareness measured parallel to the alignment direction is greater than the squareness measured perpendicular to the alignment direction. Squareness is thus enhanced by the formation of a nanocomposite permanent magnet comprised of aligned, anisotropic nanoparticles. This alignment results in the nanocomposite having a preferred magnetization direction. The remnant magnetization and energy product of the nanocomposite is thereby enhanced because of the alignment of the magnetic nanoparticles arranged within the composite.

As provided herein, the disclosed aligned nanoparticles may comprise $\alpha''$-$Fe_{16}N_2$ phase domains. Throughout this disclosure, the terms $Fe_{16}N_2$, $\alpha''$-$Fe_{16}N_2$, $\alpha''$-$Fe_{16}N_2$ phase, and $\alpha''$-$Fe_{16}N_2$ phase domain, for example, may be used interchangeably to refer to a $\alpha''$-$Fe_{16}N_2$ phase domain within a material. In some examples, an anisotropic nanoparticle formed according to techniques disclosed herein may include at least one $Fe_{16}N_2$ iron nitride crystal. In further examples, such an anisotropic particle may include a plurality of iron nitride crystals, at least some (or all) of which are $Fe_{16}N_2$ crystals. The disclosed anisotropic iron nitride nanoparticles including $Fe_{16}N_2$ may have enhanced magnetic properties, including, for example, at least one of enhanced squareness, magnetic orientation, or energy product, as compared to conventional isotropic particles including $Fe_{16}N_2$. Thus, for example, the disclosed aligned anisotropic particles including $Fe_{16}N_2$ may be desirable for permanent magnet applications.

Alignment of the disclosed nanoparticles may be detected by observing a larger squareness in hysteresis loops measured in a direction parallel to the alignment field than in a loop measured perpendicular to the alignment field. As such, nanoparticles of the present disclosure may exhibit a preferred alignment where squareness in hysteresis loops measured in a direction parallel to the alignment field is larger than the squareness in a hysteresis loop measured perpendicular to the alignment field. As an example, the iron nitride nanoparticles may exhibit a squareness measured parallel to the alignment direction that is greater than 0.50, greater than 0.75, or greater than 0.9.

As the aligned iron nitride nanoparticles include $\alpha''$-$Fe_{16}N_2$ phase domains, the alignment may be described more specifically according to the magnitudes of specific peaks in an X-ray diffraction pattern. Alignment may be detected in an X-Ray diffraction pattern that presents a preferred orientation of the (004) crystal plane $\alpha''$-$Fe_{16}N_2$ phase. The (004) peak in an X-Ray Diffraction pattern corresponds to the c-axis of $\alpha''$-$Fe_{16}N_2$'s unit cell. The c-axis is the magnetic easy axis of the $\alpha''$-$Fe_{16}N_2$ phase. Such a preferred orientation can be determined by measuring the relative intensity of the $\alpha''$-$Fe_{16}N_2$ (004) peak to the most-intense $\alpha''$-$Fe_{16}N_2$ (202) peak in a diffraction pattern, where the diffraction vector is parallel to the alignment direction.

The disclosed nanoparticles exhibit such a preferred orientation. More specifically, the disclosed nanoparticles exhibit a ratio of integrated intensities of an $\alpha''$-$Fe_{16}N_2$ (004) x-ray diffraction peak to an $\alpha''$-$Fe_{16}N_2$ (202) x-ray diffraction peak for the aligned iron nitride nanoparticles that is greater than at least 7%, where the diffraction vector is parallel to alignment direction. In some examples, the ratio of integrated intensities of an $\alpha''$-$Fe_{16}N_2$ (004) x-ray diffraction peak to an $\alpha''$-$Fe_{16}N_2$ (202) x-ray diffraction peak is greater than at least 50%. In yet further examples, the ratio of integrated intensities of an $\alpha''$-$Fe_{16}N_2$ (004) x-ray diffraction peak to an $\alpha''$-$Fe_{16}N_2$ (202) x-ray diffraction peak is greater than at least 100%.

Anisotropic iron nitride nanoparticles achieved according to the present disclosure may be shaped, for example, as needles, flakes, laminations, wires, thin sheets, or tapes. In further aspects, the anisotropic iron nitride nanoparticles may be joined or bonded to form bulk material, such as a bulk permanent magnet.

In certain aspects, these iron nitride particles may be comprised as a nanocomposite. Such a nanocomposite may comprise a population of aligned anisotropic nanoparticles, the nanoparticles comprising an $\alpha''$-$Fe_{16}N_2$ phase; and a suitable binder. The nanocomposite may exhibit a squareness measured in a parallel direction that is larger than a squareness observed in a perpendicular direction to the direction of alignment of the anisotropic nanoparticles. In further aspects, the nanocomposite may exhibit an X-ray diffraction pattern having a ratio of integrated intensities of an $\alpha''$-$Fe_{16}N_2$ (004) x-ray diffraction peak to an $\alpha''$-$Fe_{16}N_2$ (202) x-ray diffraction peak that is greater than at least 7%, where the diffraction vector is parallel to the alignment direction. In some examples, the ratio of integrated intensities of an $\alpha''$-$Fe_{16}N_2$ (004) x-ray diffraction peak to an $\alpha''$-$Fe_{16}N_2$ (202) x-ray diffraction peak is greater than at least 50%. In yet further examples, the ratio of integrated intensities of an α"-$Fe_{16}N_2$ (004) x-ray diffraction peak to an α"-$Fe_{16}N_2$ (202) x-ray diffraction peak is greater than at least 100%. A weight fraction of the nanoparticle relative to the nanocomposite may be in a range of from 80% to 95%, from 85% to 95%, or from 90% to 95%. A volume fraction of the nanoparticle relative to the nanocomposite may be in a range of from 40% to 75%, 50% to 75%, or from 60% to 75%.

In yet further aspects, and as described in further detail herein, such anisotropic iron nitride nanoparticles may be comprised as a dispersion with a suitable solvent. The iron nitride nanoparticles may include an α"-$Fe_{16}N_2$ phase. The iron nitride nanoparticles may be aligned in that a ratio of integrated intensities of an α"-$Fe_{16}N_2$ (004) x-ray diffraction peak to an α"-$Fe_{16}N_2$ (202) x-ray diffraction peak for the iron nitride nanoparticles is greater than at least 7%, where the diffraction vector is parallel to alignment direction and the dispersion exhibits a squareness measured parallel to the alignment direction that is greater than a squareness measured perpendicular to the alignment direction. A weight fraction of the nanoparticle relative to the dispersion may be in a range of from 80% to 95%, from 85% to 95%, or from 90% to 95%. A volume fraction of the nanoparticle relative to the dispersion may be in a range of from 40% to 75%, 50% to 75%, or from 60% to 75%.

Preparation of Aligned Nanoparticles and Permanent Magnets Formed Thereof

A method of forming an anisotropic permanent magnet may comprise annealing an iron-containing agglomerated powder in the presence of nitrogen to provide iron nitride nanoparticles. Iron nitride nanoparticles may be produced from iron-based precursor nanoparticles via a gas nitriding process that takes place at low temperatures (for example, less than 200° C.). This process may incorporate ammonia gas to transform the precursor nanoparticles directly into an iron nitride nanoparticle that contains the α"-$Fe_{16}N_2$ phase. The low temperature range at which this nitriding process can proceed may require an iron-based precursor with high specific surface area (such as nanoparticles or nanoporous foams) because of slow reaction kinetics.

An iron-containing agglomerated powder may include, for instance, an iron-containing raw material such as iron powder, bulk iron, $FeCl_3$, $Fe_2O_3$, or $Fe_3O_4$. In some examples, an iron-containing raw material may include substantially pure iron (such as, for example, iron with less than about 10 atomic percent (at. %) dopants or impurities) in bulk or powder form. Dopants or impurities may include, for example, oxygen or iron oxide. Agglomerated powder may describe the iron-containing material in a form of discrete collections of particles. Although a powder is described, the iron-containing raw material may be provided in any suitable form, such as a powder or relatively small particles. In some examples, an average size of particles in iron containing raw material may be between about 50 nanometers (nm) and about 5 micrometers (1 μm).

The process of annealing the iron-containing agglomerated powder may proceed according to a number of methods to reduce the nanoparticles to elemental iron Fe. As an example, in some examples, annealing the anisotropic particles including iron nitride may include heating the particles to a temperature between about 120° C. and about 250° C., such as between about 120° C. and about 180° C., for example, between about 120° C. and 150° C. Annealing may proceed under a nitrogen gas, such as ammonia.

The process of annealing may further include passivating. The nanoparticles may be passivated by controlled oxidation, forming a layer of iron oxide on the surface of the nanoparticles. The nanoparticles may also be passivated by coating the nanoparticles with another compound, such as aluminum oxide, silicon oxide, titanium oxide, aluminum nitride, and/or titanium nitride.

In some examples, the annealing process continues for between about 10 hours and about 200 hours, such as between about 10 hours and about 40 hours. In one example, annealing may proceed for about 20 hours. In some examples, the annealing process may occur under an inert atmosphere, such as argon Ar or an Ar/oxygen blend, to reduce or substantially prevent oxidation of the iron. Further, in some implementations, while the anisotropic particles including iron nitride are annealed, the temperature is held substantially constant.

In some examples, rather than being formed using a milling technique, an anisotropic particle including at least one α"-$Fe_{16}N_2$ phase domain may be formed by nitriding and annealing anisotropic iron-containing precursors. An example technique may include, for example, nitriding an anisotropic particle including iron to form an anisotropic iron nitride nanoparticle.

The iron nitride nanoparticles that have been annealed may exhibit a particular intrinsic coercivity. As an example, the iron nitride nanoparticles may exhibit an intrinsic coercivity of about 2,000 Oersteds (Oe) to 4,000 Oe. In further aspects, the iron nanoparticles have an intrinsic coercivity from 2,500 to 4,000 Oe. In yet further aspects, the iron nanoparticles have an intrinsic coercivity from 3,000 Oe to 4,000 Oe. Intrinsic coercivity may be measured according to a number of methods known in the art. In a specific example, intrinsic coercivity may be measured suing a Vibrating Sample Magnetometer (VSM).

To enhance squareness, the annealed iron nitride nanoparticles may be dispersed in a suitable fluid for further processing. A weight fraction of the iron nitride nanoparticles relative to the suitable fluid may be in a range of from 80% to 95%, from 85% to 95%, or from 90% to 95%. A volume fraction of the nanoparticle relative to the suitable fluid may be in a range of from 40% to 75%, 50% to 75%, or from 60% to 75%. The suitable fluid comprise a water-based solvent (aqueous) or an organic solvent (non-aqueous) and one or more suitable additives. The one or more additives may comprise a dispersing agent, a stabilizer, a wetting agent, a surfactant, a viscosity modifier, a corrosion inhibitor, emulsifier or any combination thereof.

Thus, in one aspect, the iron nitride nanoparticles may be dispersed in a solution of one or more stabilizers and water. The resulting dispersion may be subjected to a process for deagglomerating the nanoparticles via mechanical agitation, followed by freeze drying. These processes of mechanical agitation may comprise, but are not limited to, ultrasonication and/or mechanical ball milling. Here, the one or more stabilizers may comprise stearic stabilizers such as polyethylene glycol. The one or more stabilizers may be an electrostatic stabilizer. An electrostatic stabilizer may include sodium citrate, sodium hexametaphosphate, or citric acid. Freeze drying may proceed in the presence of a magnetic field to further promote alignment of the iron nitride nanoparticles.

In other aspects, the annealed iron nitride nanoparticles may be dispersed in an organic solvent for further processing. Accordingly, the iron nitride nanoparticles may be dispersed in a solution of one or more stabilizers and an organic solvent, and subjected to ultrasonication and/or mechanical ball milling. Stabilizers that may accompany the organic solvent may comprise organic compounds. Suitable organic compounds may include, but are not limited to, oleic acid, stearic acid, or oleylamine. The organic solvent may include a polar solvent such as methanol or a nonpolar solvent such as heptane. A suitable polar solvent may include methanol. A suitable nonpolar solvent may include heptane.

Ultrasonication may be performed by submersing the transducer of an ultrasonic probe into the nanoparticle/solvent dispersion. The ultrasonic energy may be transmitted to the nanoparticle agglomerates via the solvent. Ultrasonication produces cavitation in the solvent which may occur within and around the nanoparticle agglomerates. The collapse of the cavities creates an effect that mechanically agitates the nanoparticles, providing the force needed to force the nanoparticles apart (deagglomeration).

In some examples, the milling may be performed, for example, using milling spheres in the bin of a rolling mode, stirring mode, or vibration mode milling apparatus. In some examples, a temperature at which components are milled may be controlled to facilitate formation of anisotropic iron nitride nanoparticles. For example, a technique according to this disclosure may include milling an iron-containing raw material at a predetermined low temperature in the presence of a nitrogen source using milling media.

After processing, excess fluid may be removed and the iron nitride nanoparticles may be dried according to a suitable method. An appropriate method of drying the iron nitride nanoparticles may include freeze drying, spray drying, debinding, solvent exchange, or any combination thereof.

The dried iron nitride nanoparticles may be combined with a suitable binder composition to provide a nanoparticle binder mixture. The suitable binder composition may comprise a polymeric material and may be incorporated to further process agglomerates of iron nitride nanoparticles. In certain aspects, the polymeric material comprises an acrylic, an acrylate, a bismaleimide, an ester, a urethane, a styrene, a polyvinyl alcohol, a polyvinyl acetate, a cellulose acetate, an ethyl cellulose, a polycarbonate, a polyester, a syndiotactic polystyrene, or a combination thereof. As a specific example, a mixture of the iron nitride nanoparticles and an epoxy composition may be combined and further processed. The resulting iron nitride nanoparticle/epoxy mixture may centrifugated, for example, as a way to separate nanoparticle agglomerates by size, with the smaller agglomerates exhibiting greater squareness.

In certain aspects, the nanoparticle binder mixture may be aligned in a magnetic field. That is, in various examples, the nanoparticle binder mixture may be subjected to a magnetic field for a certain duration of time at a particular magnetic flux density, Tesla (T).

In some examples, an applied magnetic field may be at least 0.2 T (2000 Gauss). The temperature at which the magnetic field is applied may at least partially depend upon further elemental additions to the iron nitride base composition and the approach used to initially synthesize the iron nitride base composition. In some examples, the magnetic field may be at least about 0.2 T, at least about 0.3 T, at least about 1 T, at least about 2 T, at least about 5 T, at least about 6 T, at least about 8 T. In some examples, the magnetic field is between about 0.2 T and about 1 T. In other examples, the magnetic field is between about 0.3 T and about 1 T. The magnetic field may be applied as a continuous static field or as a pulsed field.

The nanoparticle binder mixture may be cured to form a permanent magnet. In a thermoset binder, the curing process occurs by crosslinking of the polymer molecules in the starting resin, fixing the nanoparticles in place. In a thermoplastic binder, curing occurs by allowing the liquid binder to cool below its glass transition temperature.

Properties and Articles

Anisotropic iron nitride nanoparticles achieved according to the present disclosure may be shaped, for example, as needles, flakes, laminations, wires, thin sheets, or tapes. The shape of the nanoparticle may be determined by the method used to form a given nanoparticle. For example, needles may be formed by nitriding nanorods. Flakes may be formed by nitriding nanoplatelets. Wires may be formed by nitriding nanofilaments.

In further aspects, the anisotropic iron nitride nanoparticles may be joined or bonded to form bulk material, such as a bulk permanent magnet. In some examples, a workpiece may include a bulk material as described. The iron nitride materials formed by the techniques described herein may be used as magnetic materials in a variety of applications, including, for example, bulk permanent magnets. Bulk permanent magnets may include a minimum dimension of at least about 0.1 mm. In some examples, the bulk material including iron nitride may be annealed in the presence of an applied magnetic field. In other examples, iron nitride materials may not be bulk materials (may have a minimum dimension less than about 0.1 mm), and the iron nitride materials may be consolidated with other iron nitride materials to form bulk permanent magnets. Examples of techniques that may be used to consolidate iron nitride magnetic materials are described in the art.

In certain aspects and as provided herein, these iron nitride nanoparticles may be comprised as a nanocomposite or as a dispersion.

In any of the above examples, other techniques for consolidating of a plurality of anisotropic iron nitride nanoparticles may be used, such as pressure, electric pulse, spark, applied external magnetic fields, a radio frequency signal, laser heating, infrared heating, for the like. Each of these example techniques for joining a plurality of anisotropic particles including iron nitride may include relatively low temperatures such that the temperatures used may leave any $Fe_{16}N_2$ phase domains substantially unmodified (such that $Fe_{16}N_2$ phase domains are not converted to other types of iron nitride).

The present disclosure provides aligned, anisotropic iron nitride nanoparticles. As noted herein, the iron nitride nanoparticles of the permanent may be aligned such that a ratio of integrated intensities of an $\alpha''$-$Fe_{16}N_2$ (004) x-ray diffraction peak to an $\alpha''$-$Fe_{16}N_2$ (202) x-ray diffraction peak for the iron nitride nanoparticles is greater than at least 7%, where the diffraction vector is parallel to alignment direction. Further, the iron nitride nanoparticles may exhibit a squareness measured parallel to the alignment direction that is greater than a squareness measured perpendicular to the alignment direction.

A permanent magnet comprising the disclosed aligned, anisotropic iron nitride nanoparticles may exhibit a number of enhanced properties, particularly enhanced squareness. As noted herein, the improved squareness may further improve performance of the permanent magnet. Improved squareness may increase the energy product by increasing the area of the permanent magnet's hysteresis loop. Furthermore, the permanent magnet may exhibit a higher remnant magnetization because of the higher squareness results in a higher density of magnetic flux lines emanating from the poles of the permanent magnet. This may result in a higher magnetomotive force (MMF), which is usable in magnetic circuits.

A permanent magnet with a high squareness may have a linear flux v. field (B v. H) curve on the second quadrant. This property may improve resistance to demagnetization in devices with a high magnetic loading, such as electric motors and generators. Aligned magnets, such as the disclosed magnet having enhanced squareness, may also exhibit enhanced coercivity, further increasing the energy product. Anisotropic permanent magnets with high squareness have higher economic value than isotropic magnets of the same composition.

In additional embodiments, the present invention provides methods to increase the coercivity (Hc) of iron nitride nanoparticles without sacrificing saturation magnetization ($M_{Sat}$) and establishes compositions that have higher Hc, and hence magnetic materials with a higher energy product. This increase in Hc while not reducing $M_{Sat}$ shifts the Hc-$M_{Sat}$ trade-off in the direction that yields higher energy product.

For example, certain methods utilize mechanical milling of the nanoparticle precursors. Mechanical milling adjusts the magnetic properties of the iron nitride nanoparticles produced from agglomerated iron oxide nanoparticles. Mechanical milling, as a way to reduce the average agglomerate size, may be used to adjust the flowability and powder handling characteristics of powders. Without being bound by any particular theory of operation, it is believed that mechanical milling may also raise the energy content of the nanoparticles by creating defects such as lattice vacancies and dislocations. The residual strain, partitioned among connected single nanoparticles, may make them to be more reactive to process gasses.

Additionally, the milling methods as described herein can promote the formation of uniform phase composition throughout the nanoparticle agglomerates. This can result in a higher mass fraction of the preferred $\alpha''$-$Fe_{16}N_2$ phase and a lower mass fraction of the deleterious $\alpha$-Fe and $\varepsilon$-$Fe_{2-3}N$ phases. This yields compositions having a higher coercivity for a given saturation magnetization than can be obtained in iron nitride nanoparticles made without milling methods. The present disclosure relates at least to the following aspects.

Aspect 1. A permanent magnet comprising: a plurality of aligned iron nitride nanoparticles wherein the iron nitride nanoparticles include $\alpha''$-$Fe_{16}N_2$ phase domains; wherein a ratio of integrated intensities of an $\alpha''$-$Fe_{16}N_2$ (004) x-ray diffraction peak to an $\alpha''$-$Fe_{16}N_2$ (202) x-ray diffraction peak for the aligned iron nitride nanoparticles is greater than at least 7%, where the diffraction vector is parallel to alignment direction, and wherein the iron nitride nanoparticles exhibit a squareness measured parallel to the alignment direction that is greater than a squareness measured perpendicular to the alignment direction.

Aspect 2. The permanent magnet of aspect 1, wherein the aligned nanoparticles are configured as a wire, a thin sheet, or a tape, and wherein the wire, thin sheet, or tape are bonded to provide the permanent magnet.

Aspect 3. The permanent magnet of aspect 1, wherein a ratio of integrated intensities of an $\alpha''$-$Fe_{16}N_2$ (004) x-ray diffraction peak to an $\alpha''$-$Fe_{16}N_2$ (202) x-ray diffraction peak is greater than at least 50%.

Aspect 4. The permanent magnet of aspect 1, wherein a ratio of integrated intensities of an $\alpha''$-$Fe_{16}N_2$ (004) x-ray diffraction peak to an $\alpha''$-$Fe_{16}N_2$ (202) x-ray diffraction peak is greater than at least 100%.

Aspect 5. The permanent magnet of aspect 1, wherein the iron nitride nanoparticles exhibit a squareness measured parallel to the alignment direction that is greater than 0.50.

Aspect 6. The permanent magnet of aspect 1, wherein the iron nitride nanoparticles exhibit a squareness measured parallel to the alignment direction that is greater than 0.75.

Aspect 7. The permanent magnet of aspect 1, wherein the iron nitride nanoparticles exhibit a squareness measured parallel to the alignment direction that is greater than 0.9.

Aspect 8. A dispersion comprising: iron nitride nanoparticles, wherein the iron nitride nanoparticles include an $\alpha''$-$Fe_{16}N_2$ phase and a solvent, wherein a ratio of integrated intensities of an $\alpha''$-$Fe_{16}N_2$ (004) x-ray diffraction peak to an $\alpha''$-$Fe_{16}N_2$ (202) x-ray diffraction peak for the iron nitride nanoparticles is greater than at least 7%, where the diffraction vector is parallel to alignment direction, and wherein the dispersion exhibits a squareness measured parallel to the alignment direction that is greater than a squareness measured perpendicular to the alignment direction.

Aspect 9. The dispersion of aspect 8, wherein the weight fraction of the nanoparticle relative to the dispersion is in a range of from 80% to 95%.

Aspect 10. The dispersion of aspect 8, wherein the weight fraction of the nanoparticle relative to the dispersion is in a range of from 85% to 95%.

Aspect 11. The dispersion of aspect 8, wherein the weight fraction of the nanoparticle relative to the dispersion is in a range of from 90 to 95%.

Aspect 12. The dispersion of aspect 8, wherein the volume fraction of the nanoparticle relative to the dispersion is in a range of from 40% to 75%.

Aspect 13. The dispersion of aspect 8, wherein the volume fraction of the nanoparticle relative to the dispersion is in a range of from 50% to 75%.

Aspect 14. The dispersion of aspect 8, wherein the volume fraction of the nanoparticle relative to the dispersion is in a range of from 60% to 75%.

Aspect 15. The dispersion of aspect 8, wherein the solvent comprises water and one or more additives.

Aspect 16. The dispersion of aspect 8, wherein the solvent comprises an organic solvent and one or more additives.

Aspect 17. A nanocomposite comprising: a population of aligned anisotropic nanoparticles, the nanoparticles comprising an $\alpha''$-$Fe_{16}N_2$ phase; and a binder, wherein the nanocomposite exhibits a squareness measured in a parallel direction that is larger than a squareness observed in a perpendicular direction to the direction of alignment of the anisotropic nanoparticles, and wherein the nanocomposite exhibits an X-ray diffraction pattern having a relative intensity of an $\alpha''$-$Fe_{16}N_2$ (004) peak that is greater than the intensity of the most-intense $\alpha''$-$Fe_{16}N_2$ (202) peak in a diffraction pattern, where the diffraction vector is parallel to the alignment direction.

Aspect 18. The nanocomposite of aspect 17, wherein the binder comprises a polymeric material.

Aspect 19. The nanocomposite of aspect 18, wherein the polymeric material comprises an epoxy, an acrylic, an acrylate, a bismaleimide, an ester, a urethane, a styrenic, a polyvinyl alcohol, a polyvinyl acetate, a cellulose acetate, an ethyl cellulose, a polycarbonate, a polyester, a syndiotactic polystyrene, or a combination thereof.

Aspect 20. The nanocomposite of aspect 5, wherein the weight fraction of the nanoparticle relative to the nanocomposite is in the range of from 80% to 95%.

Aspect 21. The nanocomposite of aspect 5, wherein the weight fraction of the nanoparticle relative to the nanocomposite is in the range of from 85% to 95%.

Aspect 22. The nanocomposite of aspect 5, wherein the weight fraction of the nanoparticle relative to the nanocomposite is in the range of from 90% to 95%.

Aspect 23. The nanocomposite of aspect 5, wherein the volume fraction of the nanoparticle relative to the nanocomposite is in the range of from 40% to 75%.

Aspect 24. The nanocomposite of aspect 5, wherein the volume fraction of the nanoparticle relative to the nanocomposite is in the range of from 50% to 75%.

Aspect 25. The nanocomposite of aspect 5, wherein the volume fraction of the nanoparticle relative to the nanocomposite is in the range of from 60% to 75%.

Aspect 26. A method of forming an anisotropic permanent magnet, the method comprising: annealing an iron-containing agglomerated powder in the presence of nitrogen to provide iron nitride nanoparticles wherein the iron nitride nanoparticles have an intrinsic coercivity of about 2,000 Oe to 4,000 Oe; dispersing the iron nitride nanoparticles in a fluid; removing excess fluid and drying the iron nitride nanoparticles; combining the iron nitride nanoparticles with a binder composition to provide a nanoparticle binder mixture; aligning the nanoparticle binder mixture in a magnetic field, and curing the nanoparticle binder mixture to form a permanent magnet.

Aspect 27. The method of aspect 26, wherein the iron nanoparticles have an intrinsic coercivity from 2,500 to 4,000 Oe.

Aspect 28. The method of aspect 26, wherein the iron nanoparticles have an intrinsic coercivity from 3,000 Oe to 4,000 Oe.

Aspect 29. The method of aspect 26, wherein the fluid is aqueous.

Aspect 30. The method of aspect 26, wherein the step of dispersing the iron nitride nanoparticles in a fluid includes: introducing the iron nitride nanoparticles to a mixture of water and one or more additives to provide an aqueous solution; and subjecting the aqueous solution to a process of ultrasonication and/or wet ball milling.

Aspect 31. The method of aspect 30, wherein the one or more additives comprises a dispersing agent, a stabilizer, a wetting agent, a surfactant, a viscosity modifier, a corrosion inhibitor, emulsifier or any combination thereof.

Aspect 32. The method of aspect 26, wherein the fluid is non-aqueous.

Aspect 33. The method of aspect 26, wherein the step of drying the iron nitride nanoparticles includes freeze drying, spray drying, debinding, solvent exchange, or any combination thereof.

Aspect 34. A permanent magnet formed according to the method of aspect 26, wherein the permanent magnet exhibits a squareness measured in a parallel direction that is larger than a squareness observed in a perpendicular direction to the direction of alignment of the nanoparticles, and wherein the permanent magnetic exhibits an X-ray diffraction pattern having a relative intensity of an $\alpha''$-$Fe_{16}N_2$ (004) peak that is greater than the intensity of the most-intense $\alpha''$-$Fe_{16}N_2$ (202) peak in a diffraction pattern, where the diffraction vector is parallel to the alignment direction.

Aspect 35. A permanent magnet formed according to the method of aspect 26, wherein a ratio of integrated intensities of an $\alpha''$-$Fe_{16}N_2$ (004) x-ray diffraction peak to an $\alpha''$-$Fe_{16}N_2$ (202) x-ray diffraction peak for the iron nitride nanoparticles is greater than at least 7%, where the diffraction vector is parallel to alignment direction.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Example I: Samples 1-6

Commercially available nanoparticles of $\gamma$-$Fe_2O_3$ were obtained as dry, agglomerated powders. The nanoparticle agglomerates were passed through a sieve column and the 25 μm-53 μm size fraction was retained. Seven lots of powder, each lot 2.0 grams in mass, were transformed into iron nitride nanoparticles in a rotary tube furnace. The iron nitride nanoparticles were formed by first by first reducing the nanoparticles into elemental iron Fe by annealing at a temperature of about 340° C. for about 17 hours in hydrogen gas flowing at about 200 standard cubic centimeters per minute (sccm). The Fe nanoparticles were then transformed into iron nitride by annealing at a temperature of about 145° C. for 19 hours in ammonia gas flowing at about 60 sccm. After cooling to room temperature under flowing nitrogen, the iron nitride nanoparticles were passivated by flowing a 1% oxygen/argon mixture over the iron nitride nanoparticles for about 2 hours at a flow rate of about 2 standard cubic feet per hour (scfh). The seven lots of iron nitride nanoparticles were blended together for further processing. The intrinsic coercivity of the blended nanoparticles was measured to be 1,971 Oe. The coercivity was measured using VSM.

Approximately 1 gram of the passivated iron nitride nanoparticles were introduced into an aqueous solution of a stabilizer and water. The mixtures were then be milled by ultrasonication and/or wet ball milling. After milling, the excess solution was removed and the nanoparticles were freeze dried, or washed with isopropyl alcohol. Ultrasonication was performed with a 200 watt probe sonicator. Wet ball milling was performed with a planetary ball mill, using stainless steel milling jars and milling media, operating at 300 rpm. Table 1 provides the milling conditions, the nanoparticle oxide coating, the milling solution, and the final treatment of the nanoparticles prior to sample preparation for Samples S1 through S5 and comparative sample CS6.

TABLE 1

Description of process conditions used in Samples S1 to S6.

| Sample | Milling condition | Oxide coating | Milling solution | Final treatment |
|---|---|---|---|---|
| S1 | Ultrasonicated for two hours | FeO | 10% polyethylene glycol −400 | Freeze dried |
| S2 | Wet ball milled for four hours | FeO | 10% sodium citrate | Freeze dried |
| S3 | Ultrasonicated for two hours | FeO | 10% polyethylene glycol −400 | Freeze dried |

TABLE 1-continued

Description of process conditions used in Samples S1 to S6.

| Sample | Milling condition | Oxide coating | Milling solution | Final treatment |
|---|---|---|---|---|
| S4 | Ultrasonicated for two hours | FeO | Distilled water | Alcohol washed |
| S5 | Ultrasonicated for two hours | AlO | 10% polyethylene glycol −400 | Freeze dried |
| CS6 | None | FeO | None | None |

The freeze dried nanoparticles were mixed with a liquid epoxy composition and the nanoparticles were allowed to settle to the bottom of the container. The excess liquid epoxy was removed and the remaining mixture was remixed with liquid epoxy and again allowed to settle, forming a gradient in the concentration of nanoparticles in epoxy from the top to bottom of the container. A sample of the nanoparticle/epoxy mixture from the top of container was withdrawn and placed in a mold situated between the poles of two permanent magnets. The magnitude of the magnetic field was about 5,000 Gauss. The nanoparticle epoxy mixture was allowed to cure in the magnetic field overnight.

The cured nanoparticle/epoxy composite formed a thin disk. The disk was about 6 mm in diameter and about 1 mm thick. The orientation of the magnetic alignment field was perpendicular to the plane of the disk.

Comparative sample CS6 included iron nitride nanoparticles that were not ultrasonicated, ball milled, or freeze dried and was made in a similar way by allowing a mixture of the nanoparticles in epoxy to cure between the pole pieces of a permanent magnet.

Figure 1A:
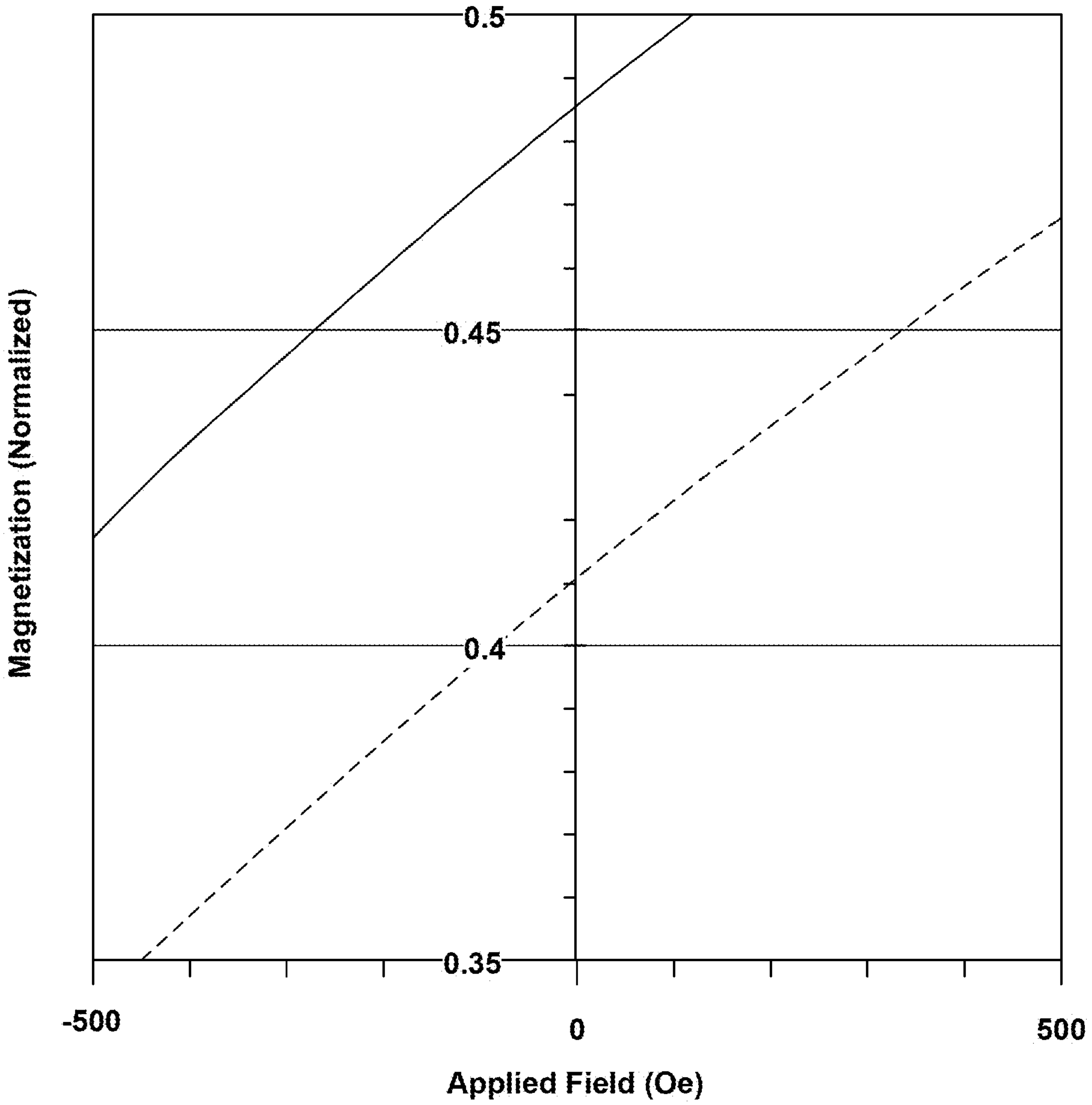
FIG. 1A shows the region of the hysteresis loops centered where the descending curves intersect the vertical axis.

FIG. 1 presents hysteresis loops measured from sample S5. The loops were measured in directions parallel to and perpendicular to the alignment. FIG. 1A shows that the squareness measured in the parallel direction was larger than the squareness in the perpendicular direction (compare 0.53 to 0.41). This phenomenon indicated that the nanoparticles in the nanoparticle/epoxy composite were at least partially aligned. The coercivity measured in the parallel direction was 2,376 Oe. The coercivity of the starting material was not recorded.

Figure 2:
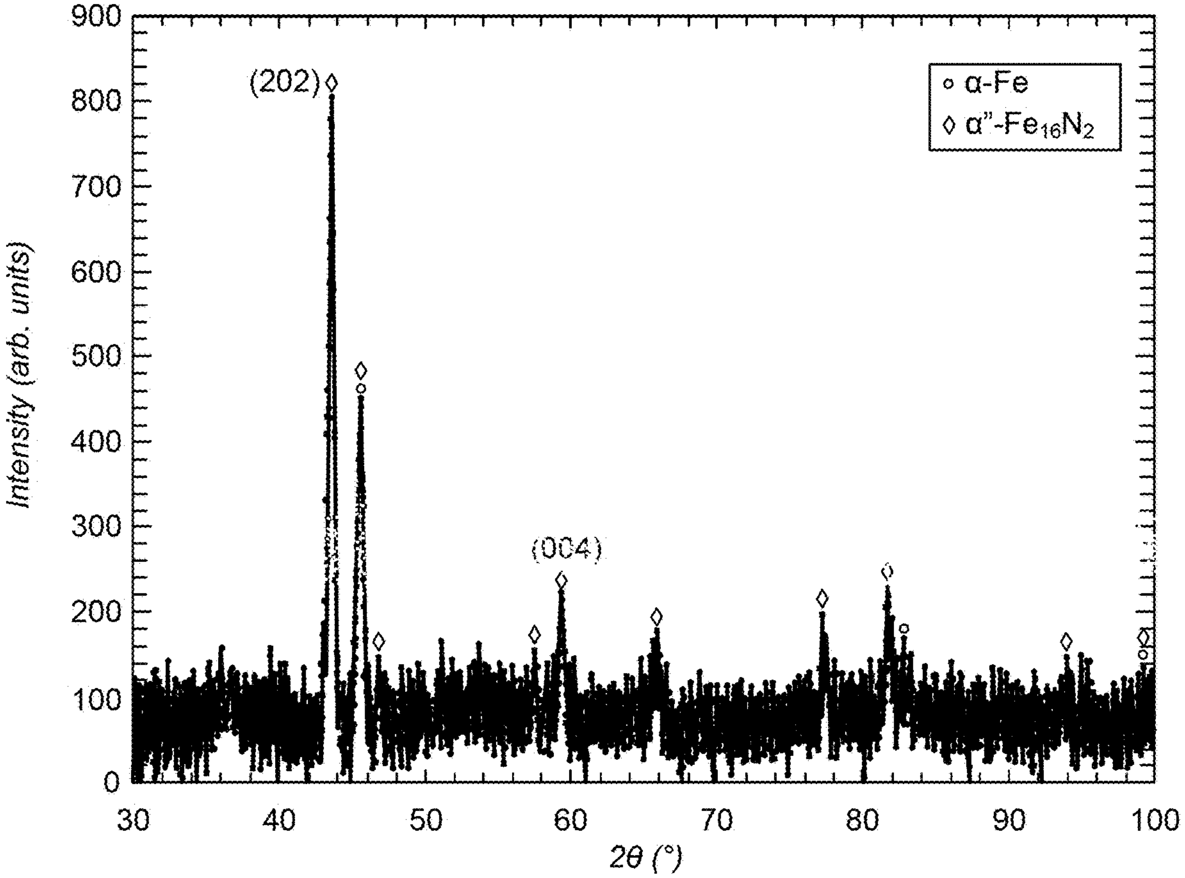
FIG. 2 presents X-Ray diffraction pattern measured on sample S5. The orientation of the diffraction vector is parallel to the alignment direction.

An X-Ray Diffraction pattern of the sample made from sample S5 is shown in FIG. 2. The XRD spectrum was collected using a D5005 x-ray diffractometer with a Cu radiation source over an angular range of 25 to 105° 2θ. The relative intensity of α"-$Fe_{16}N_2$ (004) peak is calculated by dividing the integrated intensity of α"-$Fe_{16}N_2$ (004) by the integrated intensity of the α"-$Fe_{16}N_2$ (202) peak. The relative intensity of α"-$Fe_{16}N_2$ (004) peak is calculated to be 0.22. The intensity of the α"-$Fe_{16}N_2$ (004) peak, relative to the (202) peak, is larger (0.22) than the relative intensity of the α"-$Fe_{16}N_2$ (004) peak of a comparative sample made from nanoparticles that were not sonicated (0.11, comparative sample CS6). This indicated preferred orientation of the c-axis of the α"-$Fe_{16}N_2$ phase. This was a further indication that the nanoparticles in the nanoparticle/epoxy composite were at least partially aligned.

Figure 3:
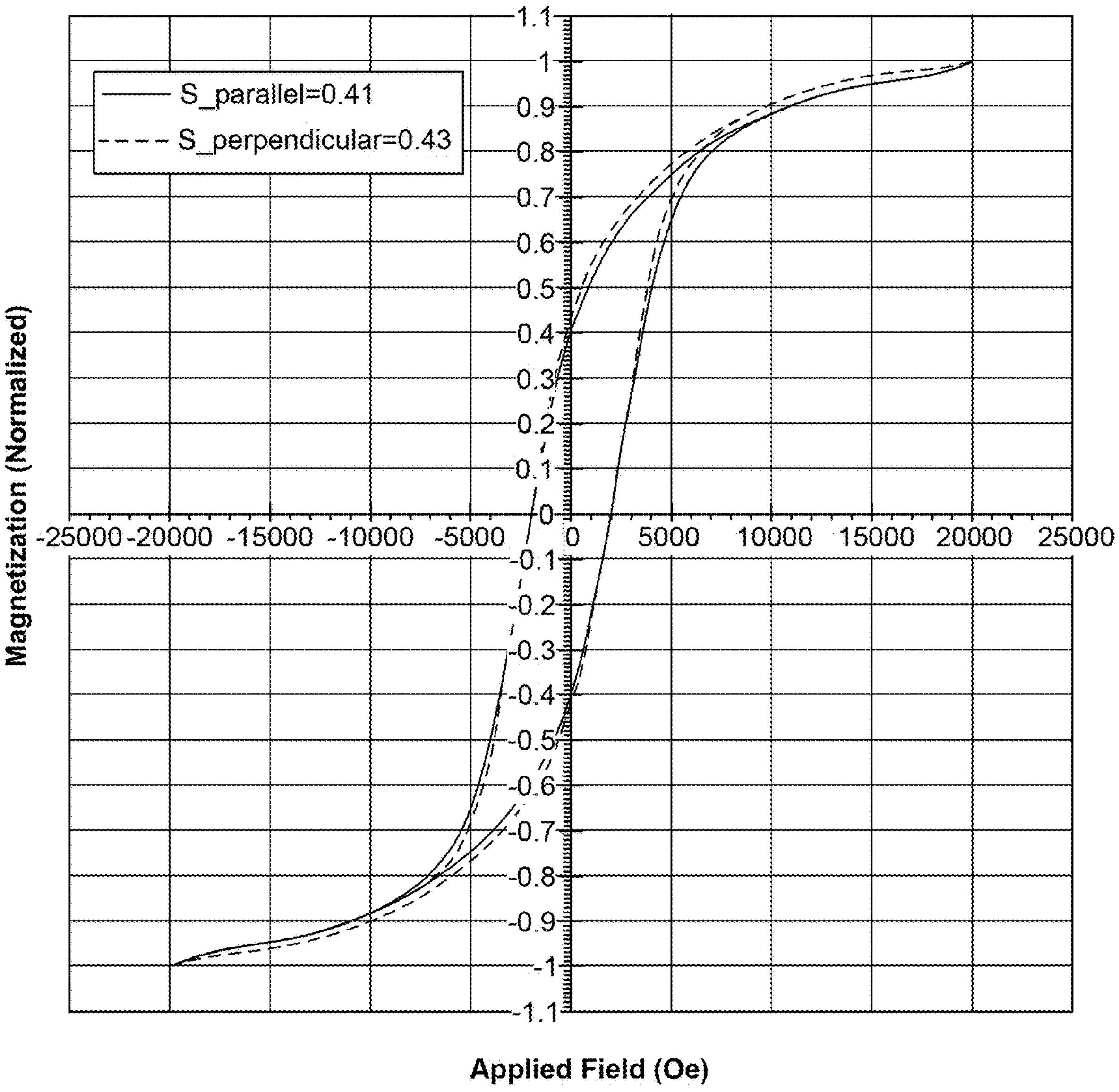
FIG. 3 presents the hysteresis loops measured on a comparative sample CS6. The measurements were made in directions both parallel to (solid line) and perpendicular to (dashed line) the alignment field direction.
Figure 3A:
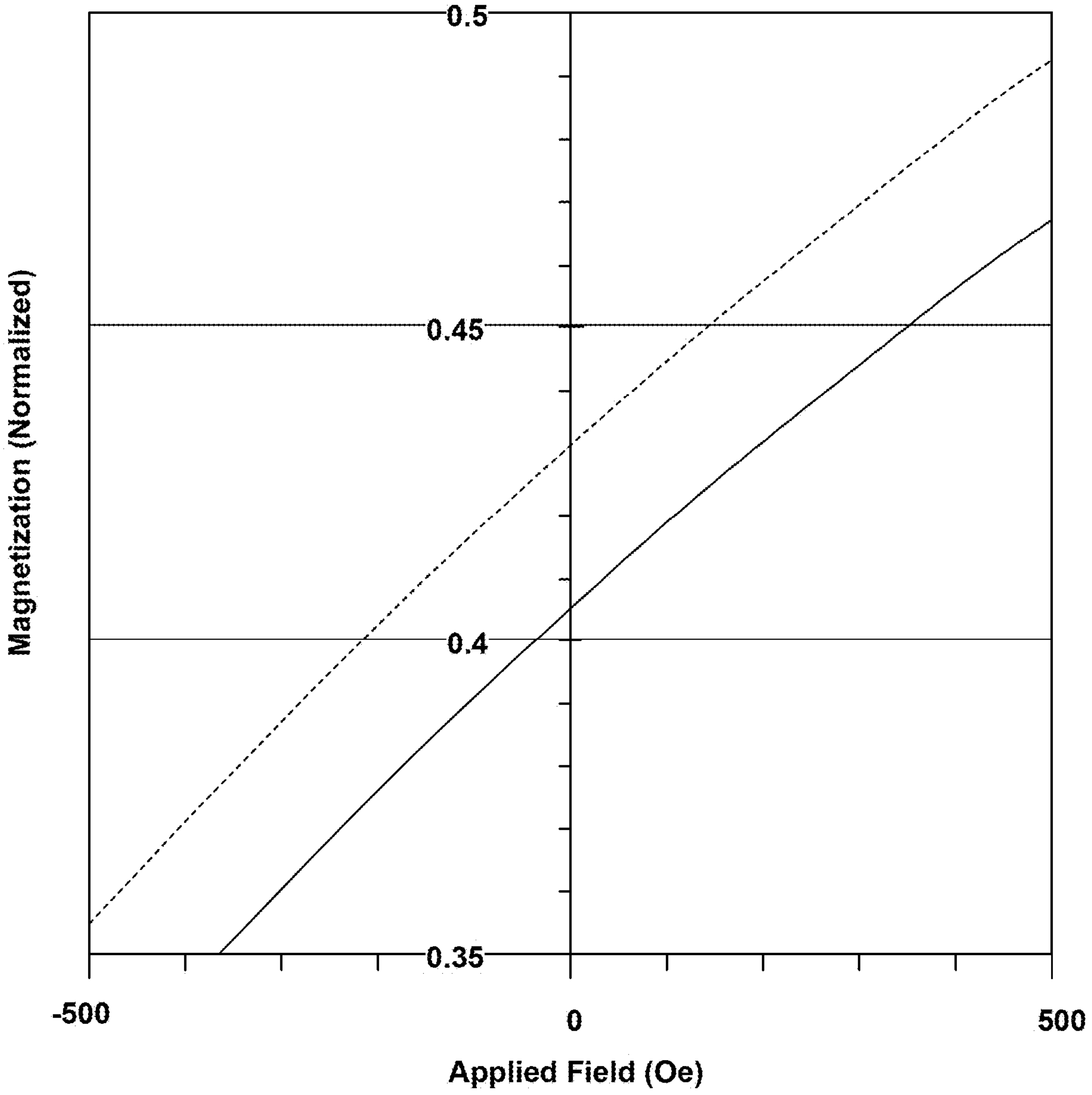
FIG. 3A shows the region of the hysteresis loops centered where the descending curves intersect the vertical axis.

Hysteresis loops measured in directions parallel to and perpendicular to the alignment field for the comparative sample CS6 are shown in FIG. 3. FIG. 3*a* shows that the squareness in the parallel direction was slightly less than the squareness in the perpendicular direction (compare 0.41 to 0.43). This indicated that the nanoparticles in sample CS6 were not oriented by the alignment field. The squareness measured in the perpendicular direction (0.33) was also larger than the squareness in the parallel direction (0.43). The coercivity measured in the parallel direction was 1,948 Oe. The coercivity of the starting material was not recorded.

Figure 4:
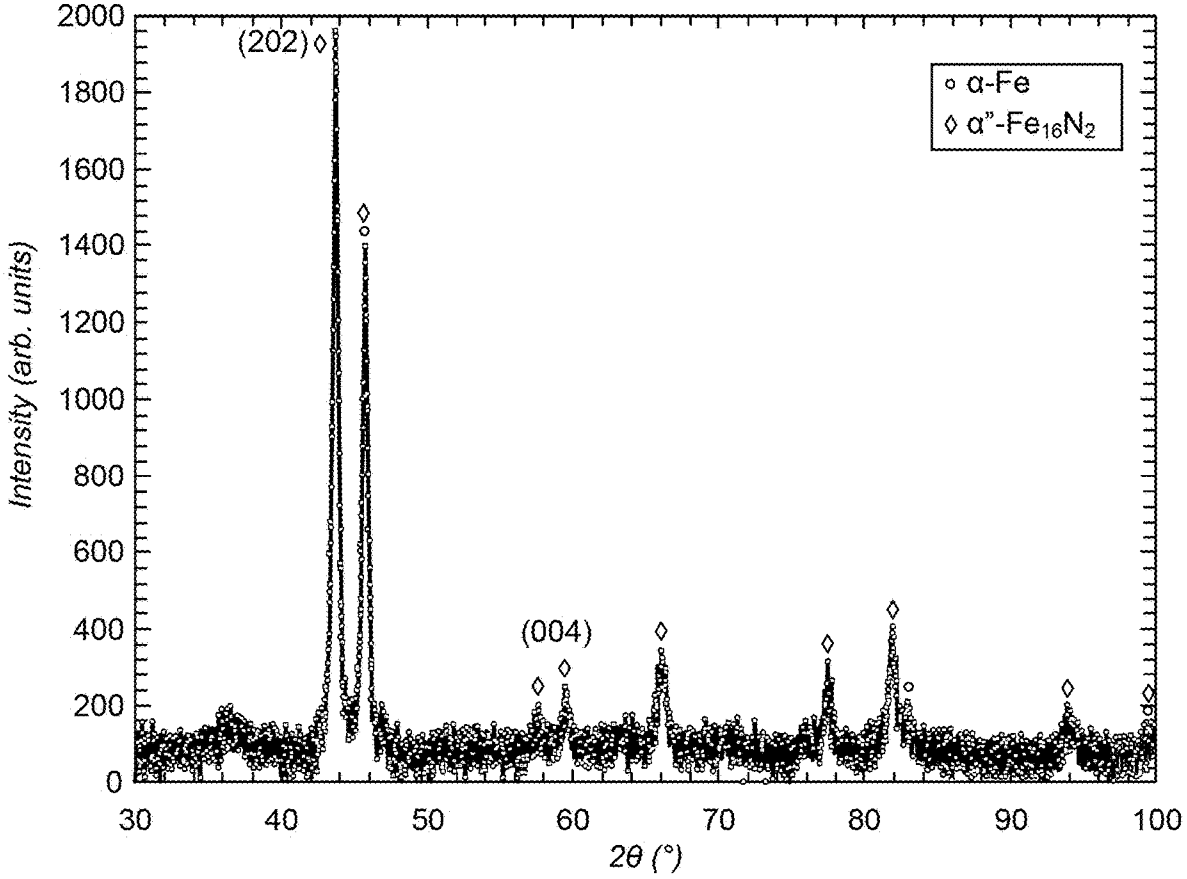
FIG. 4 presents the X-Ray diffraction pattern measured on a comparative sample CS6. The orientation of the diffraction vector is parallel to the alignment direction.

The X-Ray Diffraction pattern of the comparative sample CS6 is shown in FIG. 4. The diffraction vector was parallel to the alignment field. The observed peaks indicate a mixture of the α"-$Fe_{16}N_2$ (diamonds) and the α-Fe (circles) phases. The relative intensity of α"-$Fe_{16}N_2$ (004) peak was calculated by dividing the integrated intensity of α"-$Fe_{16}N_2$ (004) by the integrated intensity of the α"-$Fe_{16}N_2$ (202) peak. The relative intensity of α"-$Fe_{16}N_2$ (004) peak was calculated to be 0.11. The ratio of the integrated intensity of the (004) peak to the (202) peak is 0.11. This finding demonstrated the signal from a nanoparticle/epoxy composite that was not aligned.

Example II. Samples 7-15

A second series of passivated iron nitride nanoparticles were prepared, S7 through S15. These passivated iron nitride nanoparticles having a coercivity of 2,521 Oe were sonicated in a 25% oleic acid/methanol solution for about 120 minutes. The ultrasonication was performed with a 200 Watt probe sonicator. The sonicated nanoparticles were washed twice with methanol to remove excess oleic acid. The washed nanoparticles were mixed with epoxy. Table 2 provides the methods by which the samples were prepared prior to magnetic alignment. Each sample was magnetically aligned by placing it between the pole pieces of two permanent magnets. The alignment field was about 5,000 Oe. The samples were allowed to cure overnight. The aligned samples had the shape of a disk and were about 1 mm in thickness and about 6 mm in diameter, with the alignment direction perpendicular to the surface of the disk.

TABLE 2

Sample preparation methods used for iron nitride nanoparticles ultrasonicated in a solution of oleic acid and methanol

| Sample | Sample preparation method |
|---|---|
| S7 | Centrifugated, sample extracted from top of supernatant layer |
| S8 | Centrifugated, sample extracted from bottom of supernatant layer |
| S9 | Centrifugated, sample extracted from decanted and stirred supernatant |
| S10 | Centrifugated, sample extracted from sediment |
| S11 | Sample extracted from as-prepared nanoparticle/epoxy mixture |
| S12 | Sample extracted from nanoparticle/epoxy mixture diluted to 1 part in 9 |
| S13 | Sample extracted from nanoparticle/epoxy mixture diluted to 1 part in 27 |
| S14 | Sample extracted from nanoparticle/epoxy mixture diluted to 1 part in 27 and then sonicated |
| S15 | Sample extracted from nanoparticle/epoxy mixture diluted to 1 part in 27 and then pulse magnetized |

Figure 5:
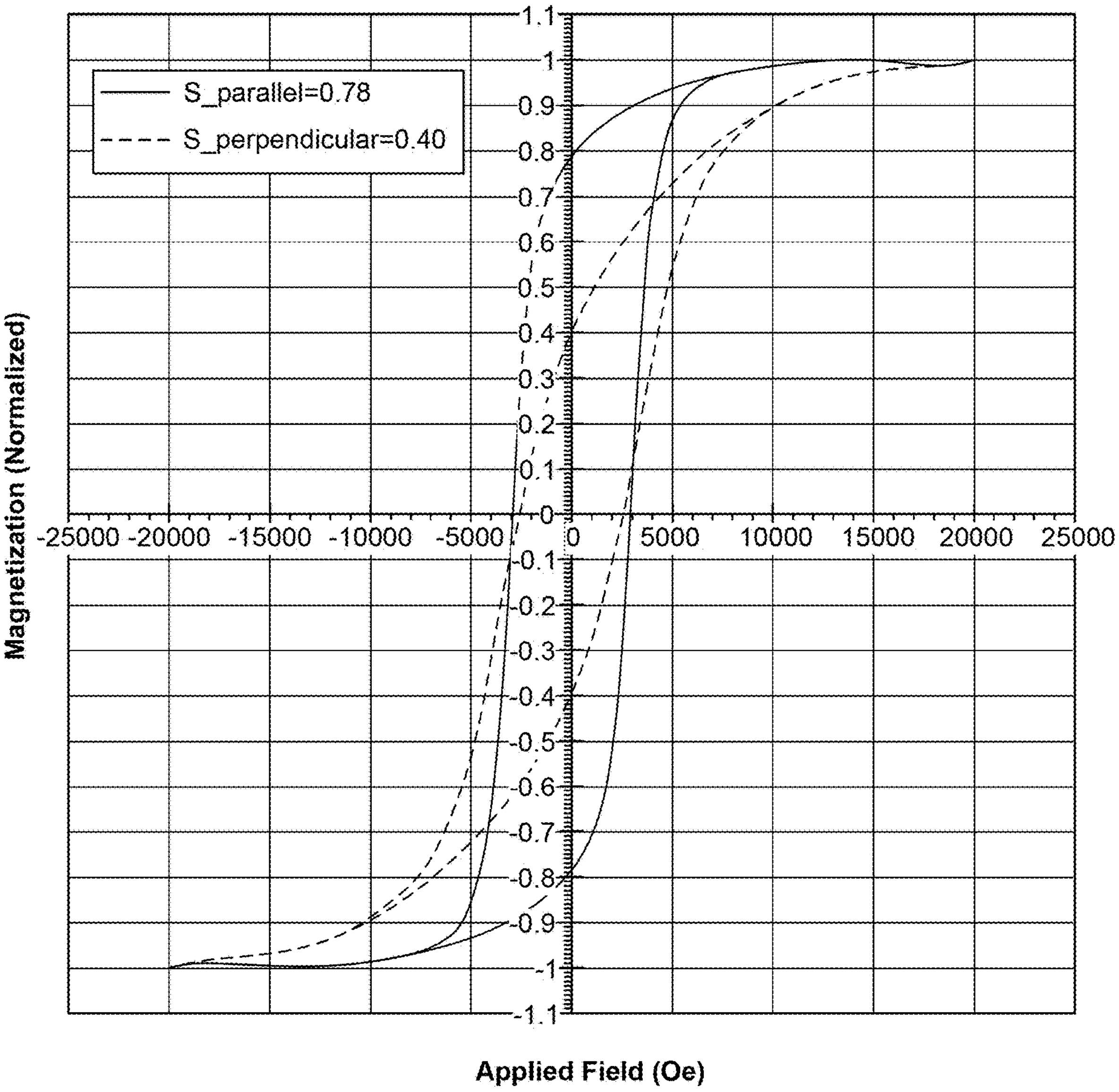
FIG. 5 presents the hysteresis loops measured on sample S8. The measurements were made in directions both parallel to (solid line) and perpendicular to (dashed line) the alignment field direction.
Figure 5A:
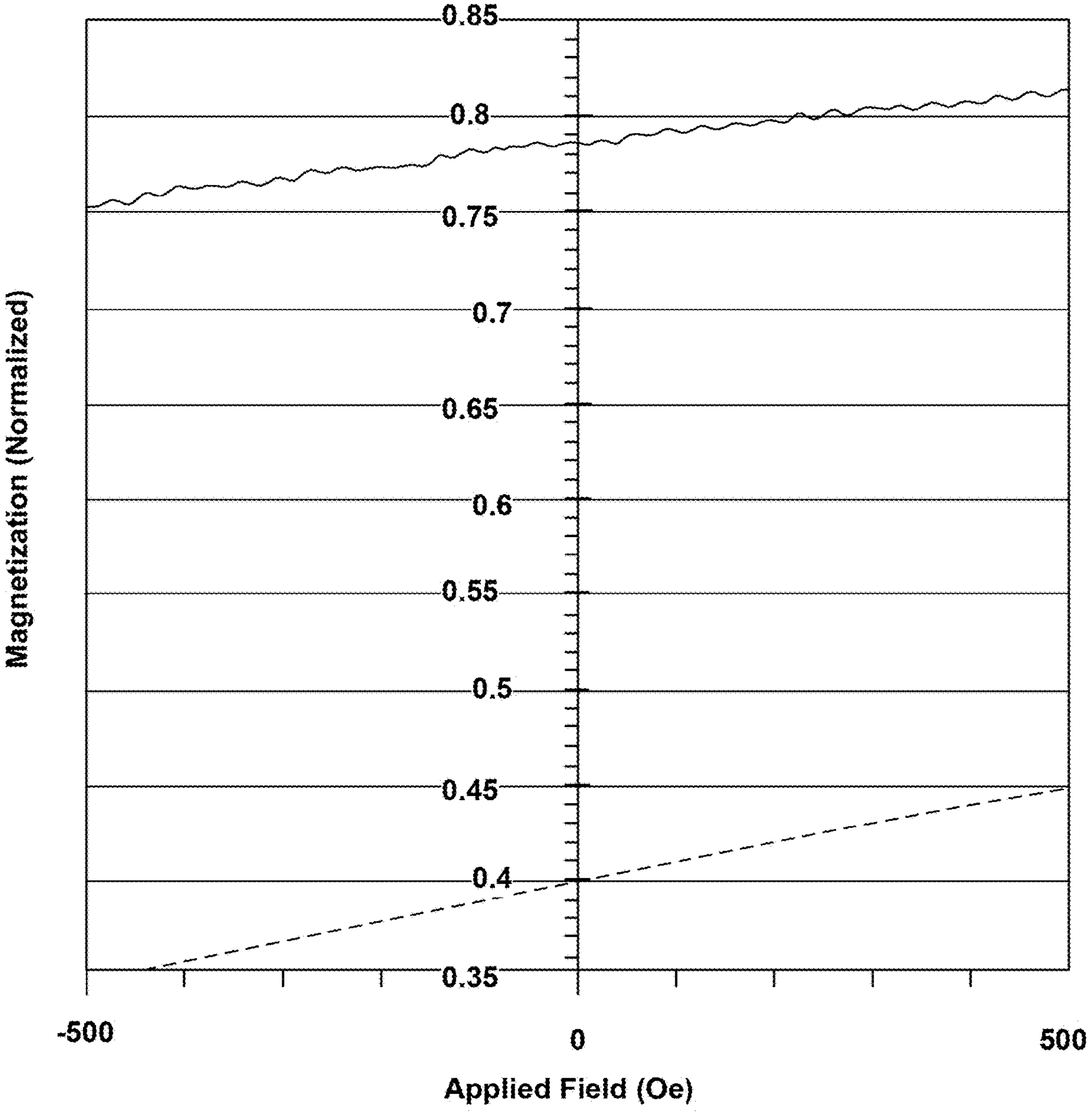
FIG. 5A shows the region of the hysteresis loops centered where the descending curves intersect the vertical axis.

FIG. 5 presents hysteresis loops measured in directions parallel to and perpendicular to the alignment field direction for sample S8. FIG. 5*a* shows that the squareness in the parallel direction (0.78) is larger than the squareness in the perpendicular direction (0.40). This indicates that the nanoparticles in Example 8 were partially oriented by the alignment field. The coercivity measured in the aligned direction was 2,917 Oe, showing a substantial enhancement over the starting material.

Figure 6:
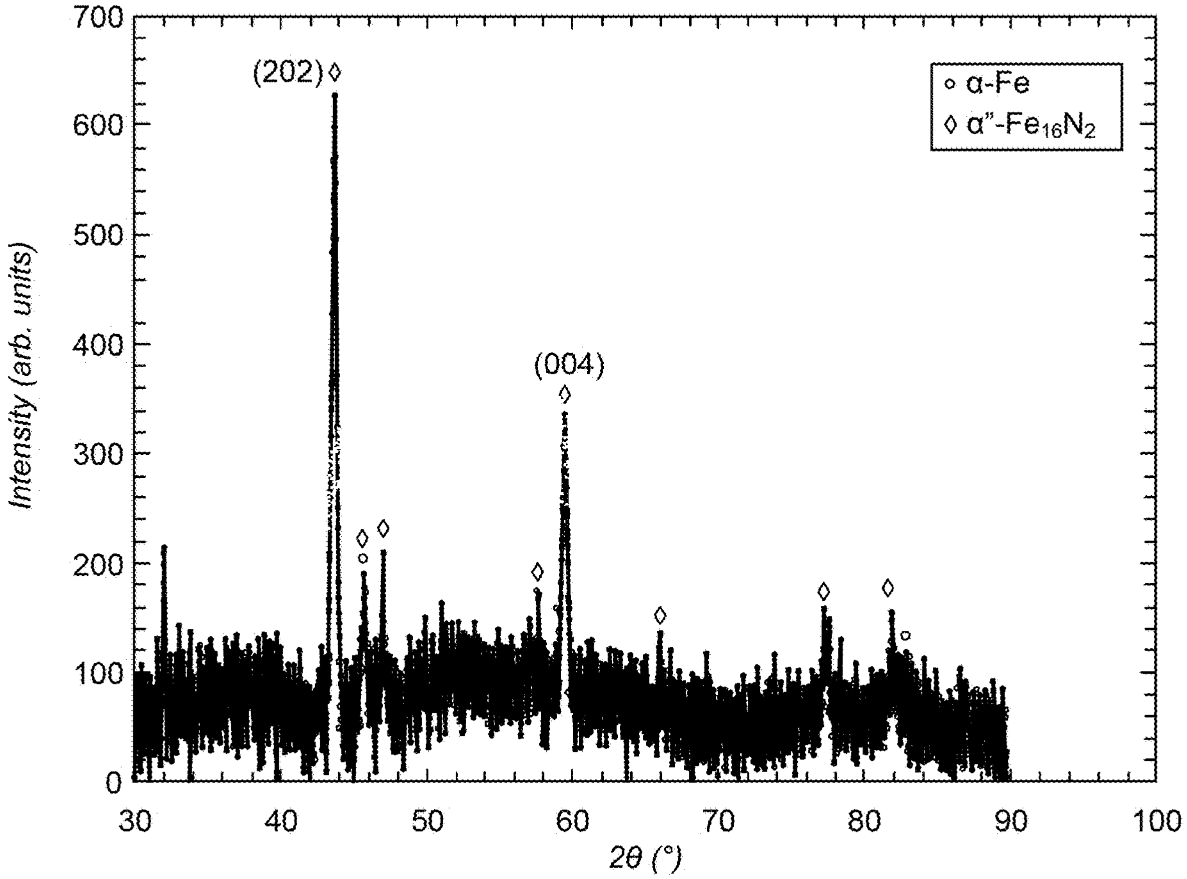
FIG. 6 presents the X-Ray diffraction pattern measured on sample S8. The orientation of the diffraction vector is parallel to the alignment direction.

FIG. 6 presents the X-Ray Diffraction pattern of Example 8. The diffraction vector is parallel to the alignment field.

The observed peaks indicate a mixture of the α"-$Fe_{16}N_2$ (diamonds) and the α-Fe (circles) phases. The relative intensity of α"-$Fe_{16}N_2$ (004) peak is calculated by dividing the integrated intensity of α"-$Fe_{16}N_2$ (004) by the integrated intensity of the α"-$Fe_{16}N_2$ (202) peak. The intensity of the α"-$Fe_{16}N_2$ (004) peak, relative to the (202) peak, was thus larger than the relative intensity of the α"-$Fe_{16}N_2$ (004) peak of a comparative sample made from nanoparticles that were not sonicated (compare 0.74 to 0.11 for CS6). This indicated a preferred orientation of the c-axis of the α"-$Fe_{16}N_2$ phase. This is a further indication that the nanoparticles in the nanoparticle/epoxy composite were at least partially aligned.

Example III: Sample 16

Passivated iron nitride nanoparticles with a coercivity of 2,357 Oe were sonicated for about 120 minutes in a 10% PEG-400/water solution to provide sample S16. After sonication, the nanoparticles were allowed to settle and the excess solution was removed. The nanoparticles were freeze dried overnight between the pole pieces of two permanent magnets. After freeze drying, a paste was observed to be suspended between the pole pieces of the permanent magnets. The suspended paste was mixed with epoxy, and a sample of the nanoparticle epoxy mixture was allowed to cure between the pole pieces of two permanent magnets.

Figure 7:
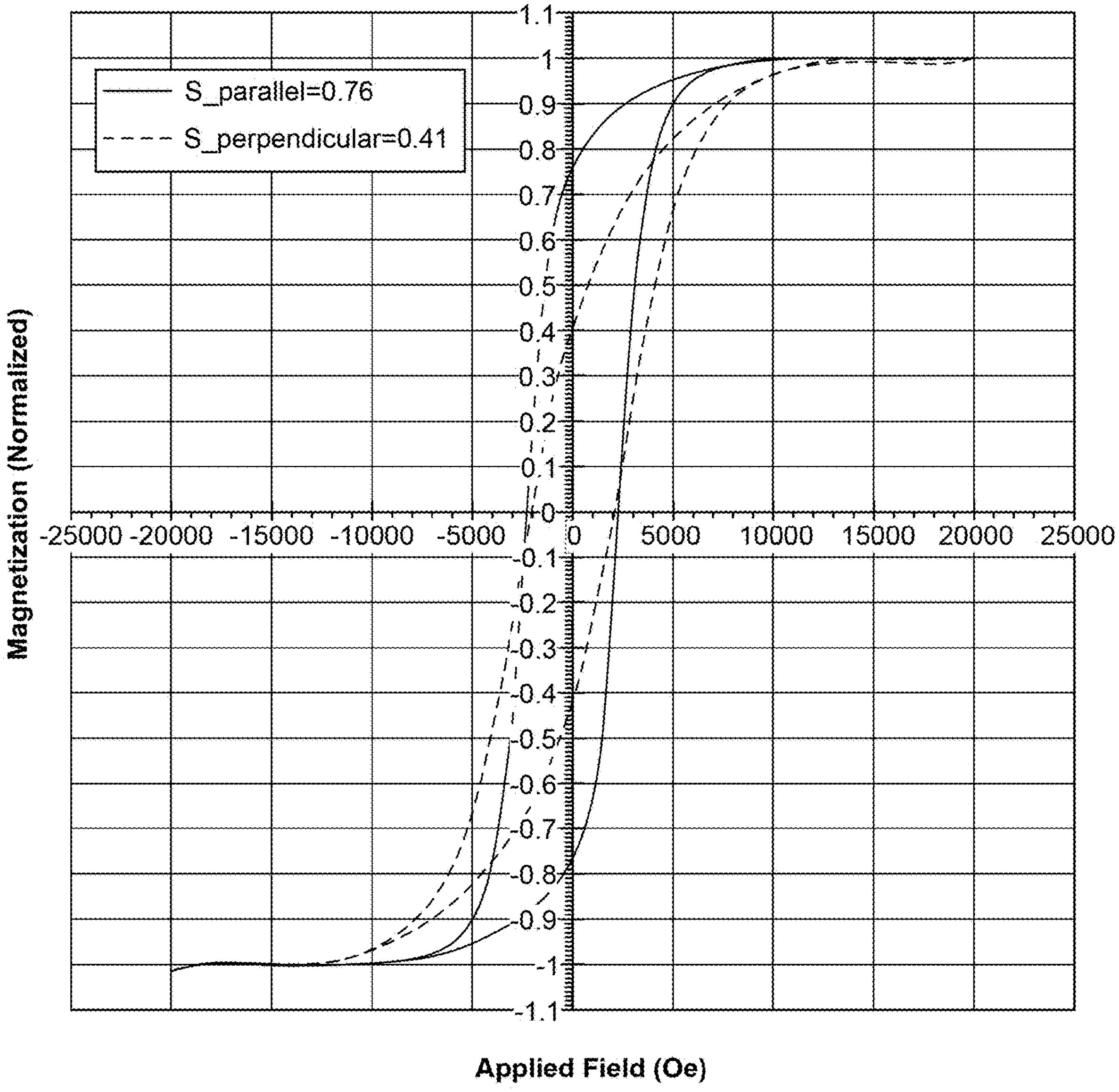
FIG. 7 presents hysteresis loops measured on sample S16. The measurements were made in directions both parallel to (solid line) and perpendicular to (dashed line) the alignment field direction. The diamagnetic contribution from the sample holder was subtracted from the hysteresis loops.
Figure 7A:
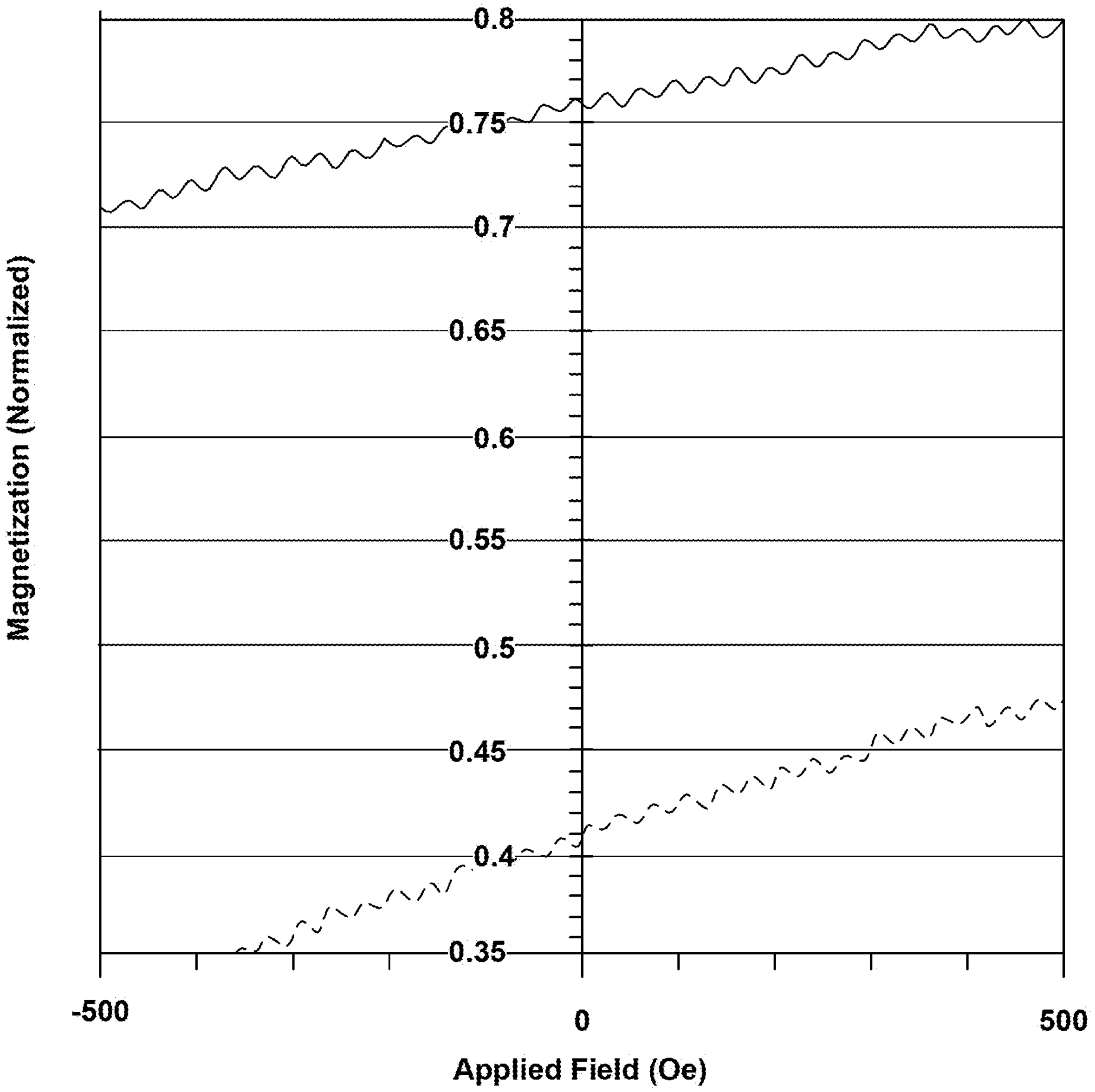
FIG. 7A shows the region of the hysteresis loops centered where the descending curves intersect the vertical axis.

Hysteresis loops measured in directions parallel to and perpendicular to the alignment field for sample S16 are shown in FIG. 7. FIG. 7*a* shows that the squareness in the parallel direction (0.76) was larger than the squareness in the perpendicular direction (0.41). This indicated that the nanoparticles in S16 were partially oriented by the alignment field. The coercivity measured in the aligned direction was 2,357 Oe, showing a slight decrease over the starting material.

Figure 8:
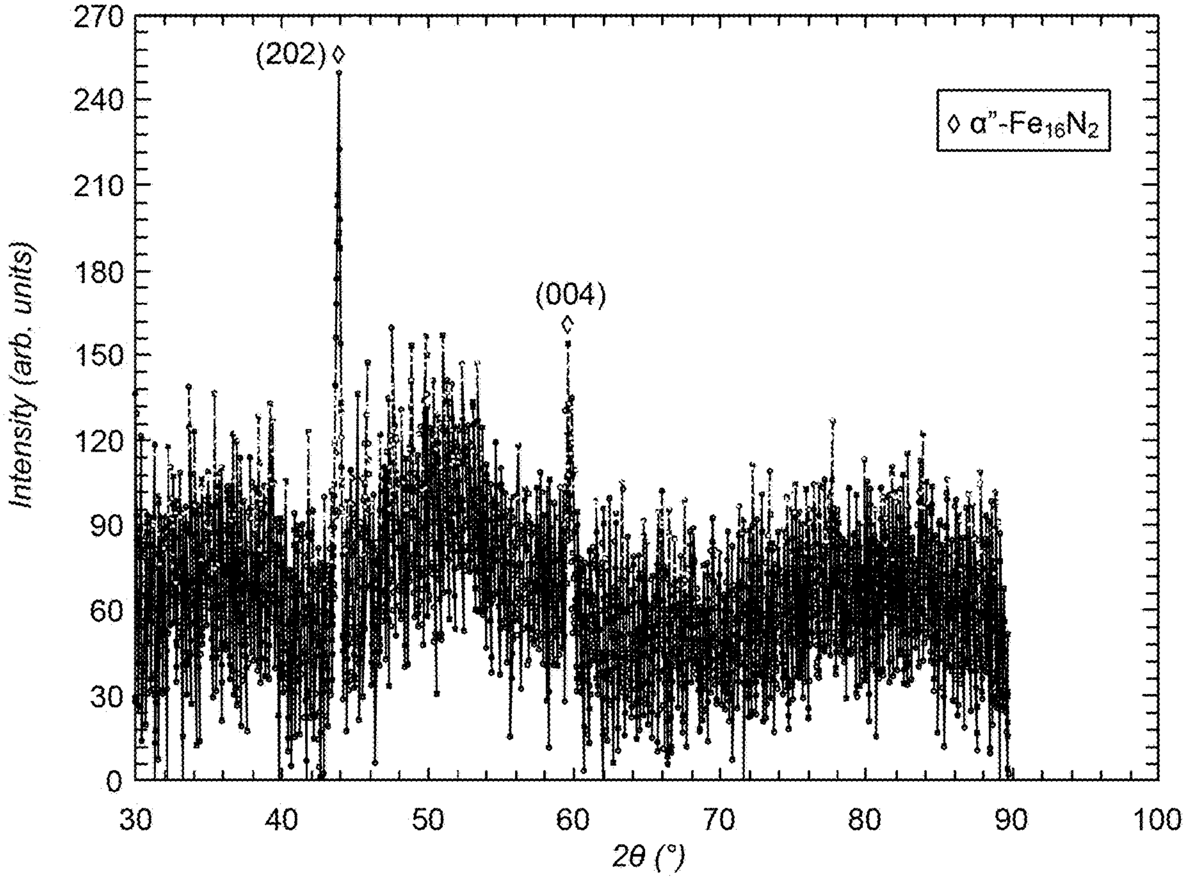
FIG. 8 presents the X-Ray diffraction pattern measured on sample S16. The orientation of the diffraction vector is parallel to the alignment direction.

The X-Ray Diffraction pattern of S16 is shown in FIG. 8. The diffraction vector is parallel to the alignment field. The diamagnetic contribution from the sample holder was subtracted from the hysteresis loops. Again, the relative intensity of α"-$Fe_{16}N_2$ (004) peak is calculated by dividing the integrated intensity of α"-$Fe_{16}N_2$ (004) by the integrated intensity of the α"-$Fe_{16}N_2$ (202) peak. The intensity of the α"-$Fe_{16}N_2$ (004) peak, relative to the (202) peak, is larger (0.55) than the relative intensity of the α"-$Fe_{16}N_2$ (004) peak of a comparative sample made from nanoparticles that were not sonicated (0.11, CS6). This indicates preferred orientation of the c-axis of the α"-$Fe_{16}N_2$ phase. This is a further indication that the nanoparticles in the nanoparticle/epoxy composite were at least partially aligned.

Table 3 summarizes the magnetic and crystallographic measurements made on the nanoparticle/epoxy composite samples for Examples I-III (S1-S5, CS6, S7-S16). The squareness was calculated by the formula:

$$\text{Squareness}=Mr/MSat \quad (1)$$

where Mr is the remnant magnetization of the nanoparticle/epoxy sample (measured where applied field, H, equals 0 Oersteds) and MSat is the saturation magnetization of the composite sample (here measured where H=20,000 Oersteds). Mr was measured using a Vibrating Sample Magnetometer (VSM). The squareness was measured from magnetization curves measured in directions parallel and perpendicular to the direction of the alignment field. A difference in the parallel and perpendicular squareness is a measure of the magnetic anisotropy of the sample. The Nanoparticle Br is a calculation of the remnant magnetization of the iron nitride nanoparticles (not including the epoxy) measured parallel to the alignment field. The relative intensity of the (004) X-Ray diffraction peak is calculated as the ratio of the (004) and (202) X-ray diffraction peaks for the α"-$Fe_{16}N_2$. In these measurements, the diffraction vector was parallel to the alignment direction. The relative intensity of the (004) peak for a randomly oriented sample of iron nitride nanoparticles would be 0.07. Thus, a relative intensity of the (004) peak greater than 0.07 indicates that crystal lattice of the iron nitride nanoparticles is preferentially oriented parallel to the alignment direction.

Table 3 also provides magnetic measurements of the aligned nanoparticles after they are put into the epoxy to form a bonded permanent magnet. The measure of the nanoparticle magnetization here is Br. This is the remnant magnetization that is produced once a field is applied to the epoxy-bonded sample and removed. Higher Br generally gives rise to better magnets. Br is a function of both the saturation magnetization and the squareness. Saturation magnetization is calculated by dividing the Br values in the table by the Squareness measured in the parallel direction using Eq. 1. This calculation gives rise to a range of MSat values between 12.5 and 14 kG, which values can be used to characterize the saturation magnetization of the nanoparticles in the bonded permanent magnets.

TABLE 3

Squareness of hysteresis loops measured directions parallel and perpendicular to the alignment field; Remanence, Br, of iron nitride nanoparticles, Intrinsic coercivity of nanoparticle; Integrated Intensity of α"-$Fe_{16}N_2$ phase (202) and (004) diffraction peaks; relative intensity of (004) peak.

| Ex. | Squareness Parallel | Squareness Perpendicular | Nanoparticle Br (kG) | Intrinsic Coercivity (Oe) | Integrated Intensity (202) | Integrated Intensity (004) | Relative Intensity (004) |
|---|---|---|---|---|---|---|---|
| 1 | 0.49 | 0.39 | 6.5 | 2,015 | 406.9 | 115.0 | 0.28 |
| 2 | 0.47 | 0.42 | 6.0 | 2,271 | 639.9 | 141.4 | 0.22 |
| 3 | 0.48 | 0.41 | | 2,106 | 383.4 | 50.9 | 0.13 |
| 4 | 0.48 | 0.41 | | 2,125 | 386.5 | 71.8 | 0.19 |
| 5 | 0.53 | 0.41 | | 2,376 | 174 | 39.1 | 0.22 |
| 6 | 0.47 | 0.42 | | 1,948 | 639.9 | 141.4 | 0.11 |
| 7 | 0.80 | 0.44 | 11.2 | 2,954 | 45.8 | 25.5 | 0.57 |
| 8 | 0.78 | 0.40 | 10.9 | 2,917 | 123.4 | 91.5 | 0.74 |
| 9 | 0.80 | 0.44 | 11.2 | 2,931 | 88.4 | 45 | 0.51 |
| 10 | 0.68 | 0.35 | 9.5 | 2,867 | 581.7 | 478.5 | 0.82 |
| 11 | 0.66 | 0.35 | 9.2 | 2,882 | 659 | 477.8 | 0.72 |
| 12 | 0.68 | 0.38 | 9.5 | 2,886 | 300.8 | 106.2 | 0.35 |
| 13 | 0.73 | 0.41 | 10.2 | 2,901 | 143.6 | 55.3 | 0.39 |
| 14 | 0.66 | 0.36 | 9.2 | 2,883 | 879.7 | 516.9 | 0.59 |
| 15 | 0.67 | 0.35 | 9.4 | 2,877 | 487.4 | 332.5 | 0.68 |
| 16 | 0.76 | 0.41 | 9.5 | 2,238 | 13.6 | 7.0 | 0.55 |

In other embodiments mechanical milling methods promote the formation of uniform phase composition throughout the nanoparticle agglomerates, which results in a higher mass fraction of the preferred α"-$Fe_{16}N_2$ phase and a lower mass fraction of the deleterious α-Fe and ε-$Fe_{2\text{-}3}N$ phases. The combination of uniform phase composition and increased amount of preferred α"-$Fe_{16}N_2$ phase yields higher coercivity for a given saturation magnetization compared to conventional iron nitride nanoparticles made without the milling methods. A number of processes are described throughout this disclosure. Iron nitride nanoparticles, compositions, and magnetic materials made using these processes will have improved magnetic properties, such as higher coercivity, higher energy product, and the like, compared to comparable iron nitride nanoparticles, compositions, and magnetic materials made without such processing.

For example, in one embodiment agglomerated iron oxide nanoparticles are mechanically milled prior to reduction, nitriding, and passivation steps. The agglomerates of iron oxide nanoparticles are received as dry agglomerates. The agglomerates are comprised of large numbers of iron oxide nanoparticles that have particle diameters in the range from 1 and 100 nanometers. The agglomerates are in the range from 1 to 200 micrometers in diameters and have porosities that range from 10 to 90 volume percent. Within the agglomerates, the nanoparticles are bound together by a combination of chemical, electrostatic, magnetic, and/or frictional forces.

As to the mechanical milling, any form of mechanical milling may be contemplated to deagglomerate the nanoparticles. For example, mechanical milling of the iron oxide agglomerates may be achieved by any of ultrasonication in a fluid, ball milling in the presence of a fluid, dry ball milling, high shear mixing in the presence of a fluid, jet milling in a high velocity gas flow, or some combination thereof. The fluid may be water, an organic solvent, or another fluid that can carry the nanoparticle agglomerates. The fluid may contain a surfactant to promote the deagglomeration of the nanoparticles. The fluid may be removed after milling by any of drying methods such as freeze drying and/or spray drying. The agglomerated iron oxide nanoparticles may be sieved through before or after the milling process. The temperature of the milling process may be controlled to avoid overheating or sintering of the nanoparticles. For example, the temperature may be controlled by immersing the milling container in an ice bath. Alternatively, a purposely designed cryomilling equipment may be utilized.

The effect of the milling process is to reduce the average size of the agglomerated iron oxide nanoparticles. The agglomerate size may be expressed as Dx, determined as the diameter below which x % of the cumulative size distribution is contained. Often, the agglomerate size is expressed as $D_{50}$, determined as the diameter below which 50% of the cumulative size distribution is contained. For example, a $D_{50}$ means that 50% of all particles have a particle size which is equal to or less than the value indicated. Correspondingly, a $D_{99}$ means that 99% of all particles have a particle size which is equal to or less than the value indicated. The agglomerate size distribution may be measured by laser diffraction, dynamic light scattering, optical microscopy and/or electron microscopy.

The effect of the milling process may also introduce crystalline defects such as vacancies, dislocations, strain gradients inside of the nanoparticle agglomerates, and may also reduce the strength of the interparticle bonds that form due to partial sintering. The strain induced in the agglomerates during milling may be helpful for later gas reduction and nitriding because it may cause micropores to form within the nanoparticles.

In another embodiment, agglomerated iron nanoparticles are mechanically milled after the reduction step is completed but before the nitriding step is performed. The iron nanoparticles may be exposed to reducing species. For example, a hydrogen reduction step may be applied prior to nitriding the iron nanoparticles, which creates micro-channels to enhance nitrogen diffusion. The iron nanoparticles may be exposed to $H_2$ at a temperature between about 200° C. and about 500° C. for up to about 24 hours. In some examples, the material may be exposed to $H_2$ at a temperature of about 300° C. or higher. A flow rate of hydrogen source during the hydrogen reduction may be about 100 standard cubic centimeters per minute (sccm) or higher. In some examples, a flow rate of hydrogen source during the hydrogen reduction may be about 400 standard cubic centimeters per minute (sccm) or higher. In other examples, as the reactor vessel size and amount of particles increases from grams to kilograms, a flow rate of hydrogen source during the hydrogen reduction may be greater than 400 sccm and as high as 10 liters per minute (lpm) or higher. The mechanical milling process may fully or partially reverse any sintering of the iron nanoparticles that might have occurred during the reduction step. Dry milling methods, such as dry ball milling, are contemplated to avoid reoxidation and/or contamination of the iron nanoparticles prior to nitriding. The dry ball milling may be performed in an inert atmosphere, such as nitrogen, argon, and/or helium, in order to prevent oxidation of the iron nanoparticles.

In another embodiment, agglomerated iron nitride nanoparticles are mechanically milled after the nitriding is completed but before any further coatings and/or passivation layers are placed on the surfaces of the iron nitride nanoparticles. Nitriding the iron nanoparticles may include exposing the iron nanoparticles to an atomic nitrogen substance, which diffuses into the iron nanoparticles. In some examples, the atomic nitrogen substance may be supplied as diatomic nitrogen ($N_2$), which is then separated (cracked) into individual nitrogen atoms. In other examples, the atomic nitrogen may be provided from another atomic nitrogen precursor, such as ammonia ($NH_3$). In other examples, the atomic nitrogen may be provided from urea ($CO(NH_2)_2$). The nitrogen may be supplied in a gas phase alone (e.g., substantially pure ammonia or diatomic nitrogen gas) or as a mixture with a carrier gas. In some examples, the carrier gas is argon (Ar). In this embodiment, the mechanical milling process may fully or partially reverse any sintering of the nanoparticles that may occur during the reduction and nitriding steps.

Coating and/or passivation may stabilize the milled particles and prevent reagglomeration. Surface oxidation can be reduced by use of surface passivation methods. While not wishing to be bound by any theory, reducing or substantially preventing oxidation of the iron nitride particles may contribute to improved magnetic properties of the annealed iron nitride nanoparticles, such as coercivity, magnetization, and the like. In some examples the iron nitride nanoparticles can be coated. Suitable coatings include carbon and boron. In other examples, the coating may be aluminum oxide, or Copper metal, or Aluminum metal. The coating may be deposited using Atomic Layer Deposition. Dry milling methods, such as dry ball milling, are contemplated to avoid reaction and decomposition of the iron nitride nanoparticles. The dry ball milling may be performed in an inert atmosphere, such as nitrogen, argon, and/or helium, in order to prevent oxidation of the iron nitride nanoparticles.

In yet another embodiment, the agglomerated iron nitride nanoparticles may be mechanically milled after passivation but prior to magnetic alignment. Annealing iron nitride nanoparticles in the presence of an applied magnetic field may enhance the $Fe_{16}N_2$ phase domain formation in the iron nitride nanoparticles. Increased volume fractions of $\alpha''$-$Fe_{16}N_2$ phase domains may improve the magnetic properties of core-shell nanoparticles including iron nitride. Improved magnetic properties may include, for example, coercivity, magnetization, and magnetic orientation.

In certain embodiments, the mechanical milling process can increase the magnetic anisotropy of the agglomerated iron nitride nanoparticles by fully or partially deagglomerating them to their discrete single crystal components. The mechanical milling of the iron nitride agglomerates can be suitably achieved by ultrasonication in a fluid, ball milling in the presence of a fluid, dry ball milling, high shear mixing in the presence of a fluid, jet milling, and the like, or some combination of these methods. The fluid may be aqueous (e.g., water or water-containing), non-aqueous (e.g., an organic solvent, or containing an organic solvent), or another fluid in which the nanoparticle agglomerates can be dispersed, as well as combinations thereof. The fluid may have a surfactant, dispersing agent, or both, added to it to promote the deagglomeration of the nanoparticles and/or to prevent the reagglomeration of the nanoparticles. The fluid may be removed after milling by any of drying methods such as freeze drying and/or spray drying. The effect of the milling process is to reduce the average size the agglomerated iron oxide nanoparticles. The mechanical milling may be done at milling energies sufficient to deagglomerate the nanoparticles but not high enough to disrupt the passivation layer coating the iron nitride nanoparticles. The agglomerated iron nitride nanoparticles may be sieved through before or after the milling process. The milled iron nitride nanoparticles may be subjected to an additional passivation and/or coating step to repair any damage to the oxide shells sustained during the milling process. As previously mentioned, iron nitride nanoparticles, compositions, and magnetic materials made using the aforementioned processes will have improved magnetic properties, such as higher coercivity, higher energy product, and the like, compared to comparable iron nitride nanoparticles, compositions, and magnetic materials made without such processing.

The milling media and containers used during wet and dry ball milling of nanoparticles may themselves be magnetic or non-magnetic. In some situations, the use of magnetic milling media and containers may be preferred because they may help avoid sedimentation of the nanoparticles in crevices of the milling containers. In other situations, the use of non-magnetic milling media and containers may be contemplated as a way to increase milling efficiency and yield by helping to minimize magnetic agglomeration of the nanoparticles.

In yet another embodiment, milling steps may be performed at any combination of steps in the process. In one example, milling could be performed prior to reduction and after nitriding. In another example, milling could be performed prior to reduction and after nitriding and after passivation.

Some modifications of the process may be contemplated to prepare the agglomerated iron oxide nanoparticles as precursors. If the iron oxide nanoparticles are made by chemical means, then a capping agent may be used to arrest the growth of the nanoparticles and prevent agglomeration. Alternatively, a digestive ripening method may be used to chemically modify the iron oxide nanoparticle size distribution. If the iron oxide nanoparticles are made by vapor-phase condensation, then the processing methods may be adjusted to promote the formation of spherical nanoparticles with a narrow particle size distribution.

Generally, higher milling energies are needed to produce and/or modify the nanoparticles than to deagglomerate clumps of nanoparticles. The mechanical milling methods in the present invention generally tend to deagglomerate clumps of nanoparticles and also beneficially change the behavior of the nanoparticles during the reduction, nitriding, passivation, and/or alignment operations.

Figure 9:
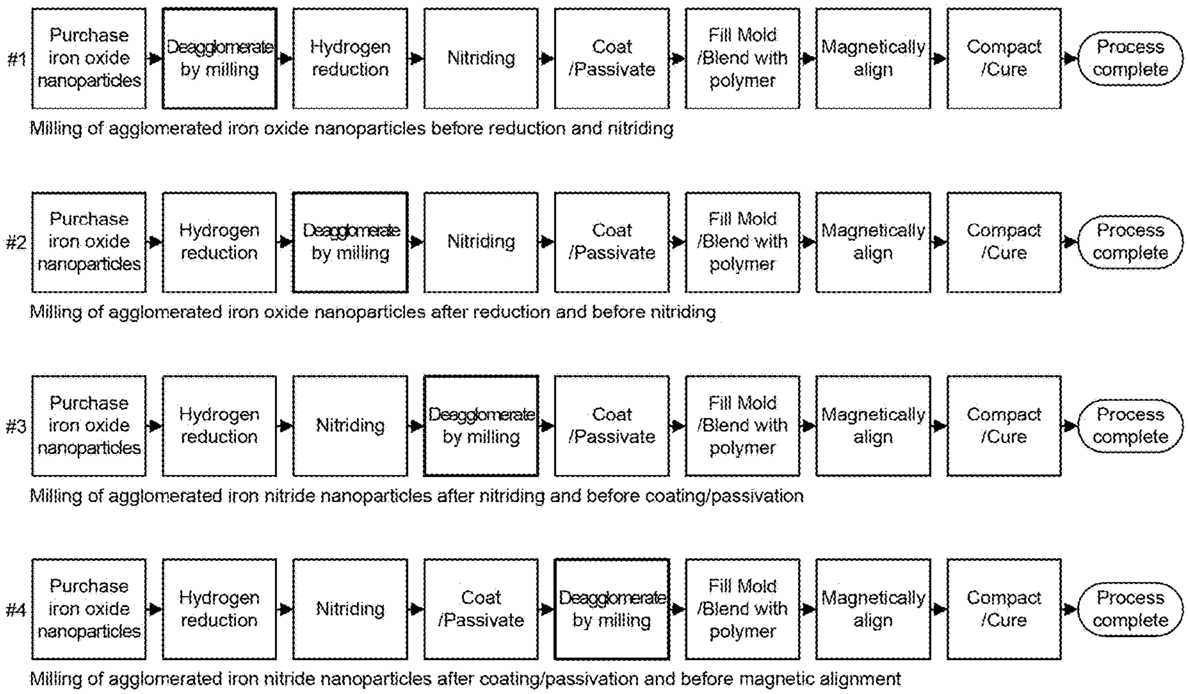
FIG. 9 shows exemplary embodiments in accordance to the present invention.

FIG. 9 shows four different materials processing schemes for making iron nitride magnets. Scheme #1 depicts milling of agglomerated iron oxide nanoparticles before reduction and nitriding. Scheme #2 depicts milling of agglomerated nanoparticles after reduction and before nitriding. Scheme #3 depicts milling of agglomerated nanoparticles after nitriding and before coating/passivation. Scheme #4 depicts milling of agglomerated nanoparticles after coating/passivation and before magnetic alignment.

Figure 10:
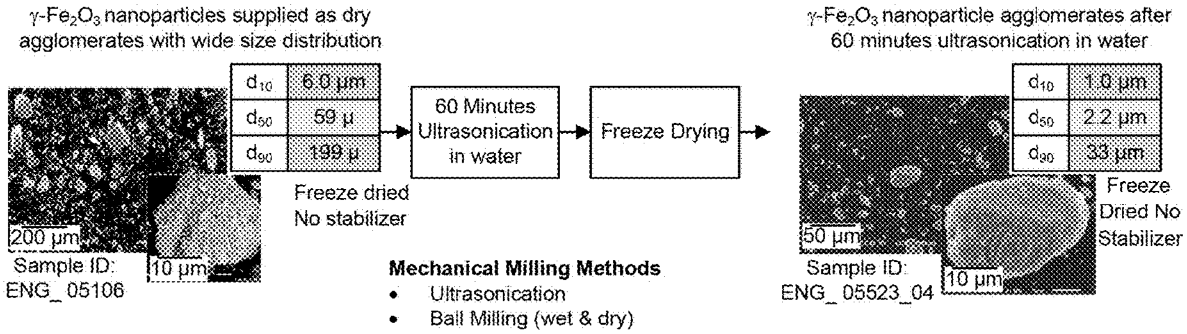
FIG. 10 shows deagglomeration of nanoparticles in accordance to exemplary embodiments.

FIG. 10 shows deagglomeration of nanoparticles in accordance to exemplary embodiments. Mechanical milling methods such as ultrasonication and/or ball milling (wet & dry) of gamma-iron oxide nanoparticles supplied as dry agglomerates are quite effective at reducing the particle size and size distribution if the agglomerates.

Figure 11:
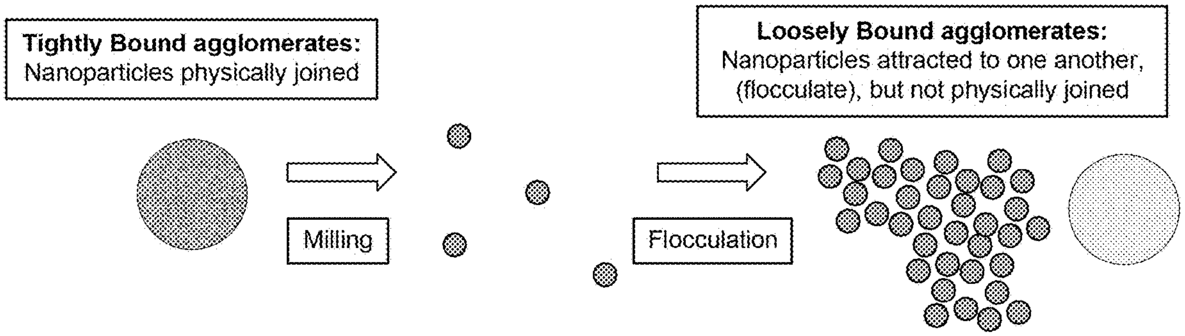
FIG. 11 presents a description of agglomerated nanoparticles.

FIG. 11 presents a description of agglomerated nanoparticles. Tightly bound agglomerates are made up of a plurality of nanoparticles that are physically joined. Loosely bound agglomerates of nanoparticles are characterized as having the nanoparticles attracted to one another (flocculate), but not physically joined. Stabilizers desirably help to prevent flocculation such that the size distribution of the iron oxide nanoparticles are on the order of tens of nanometers in size.

Figure 12:
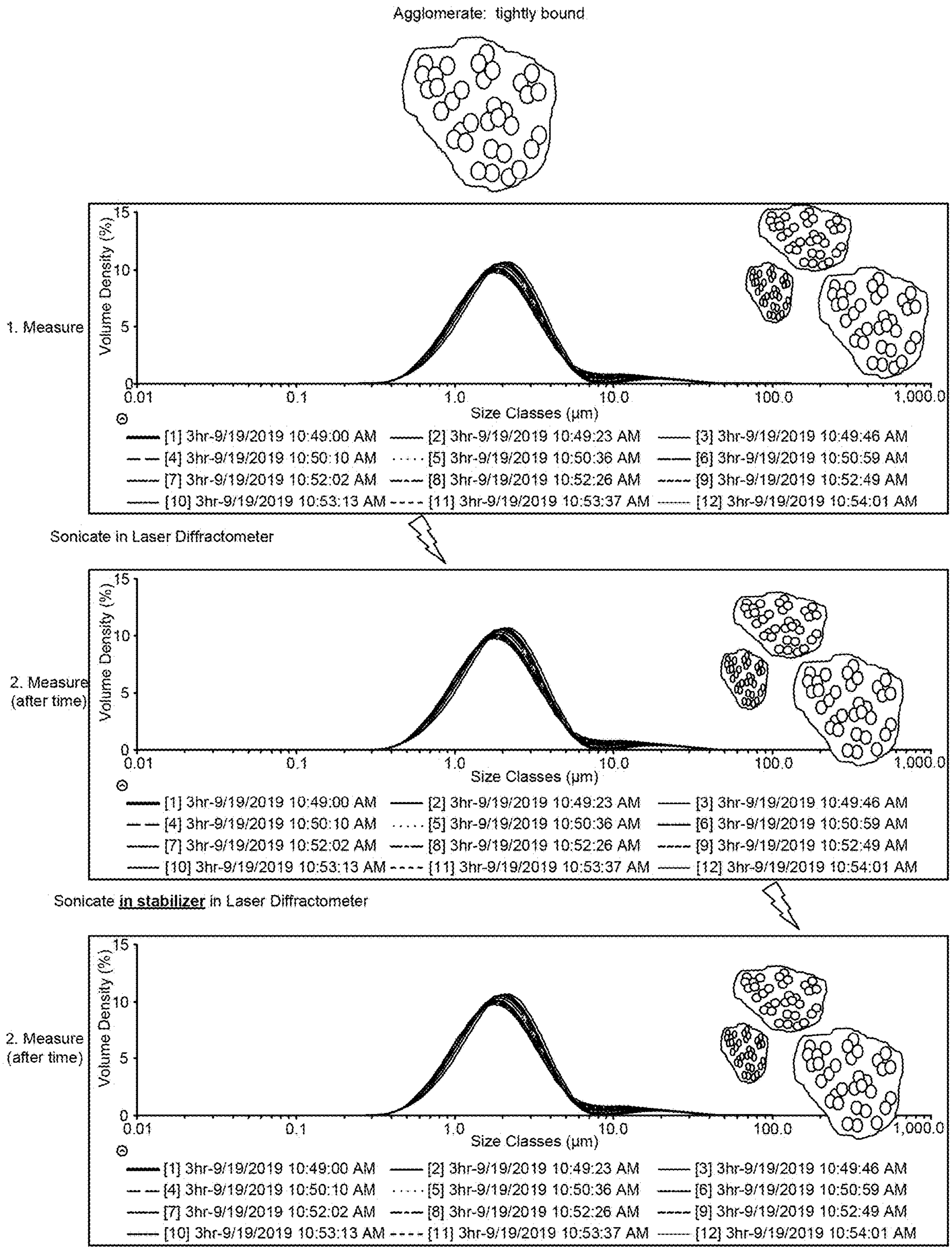
FIG. 12 presents a description of agglomerated nanoparticles.
Figure 12:
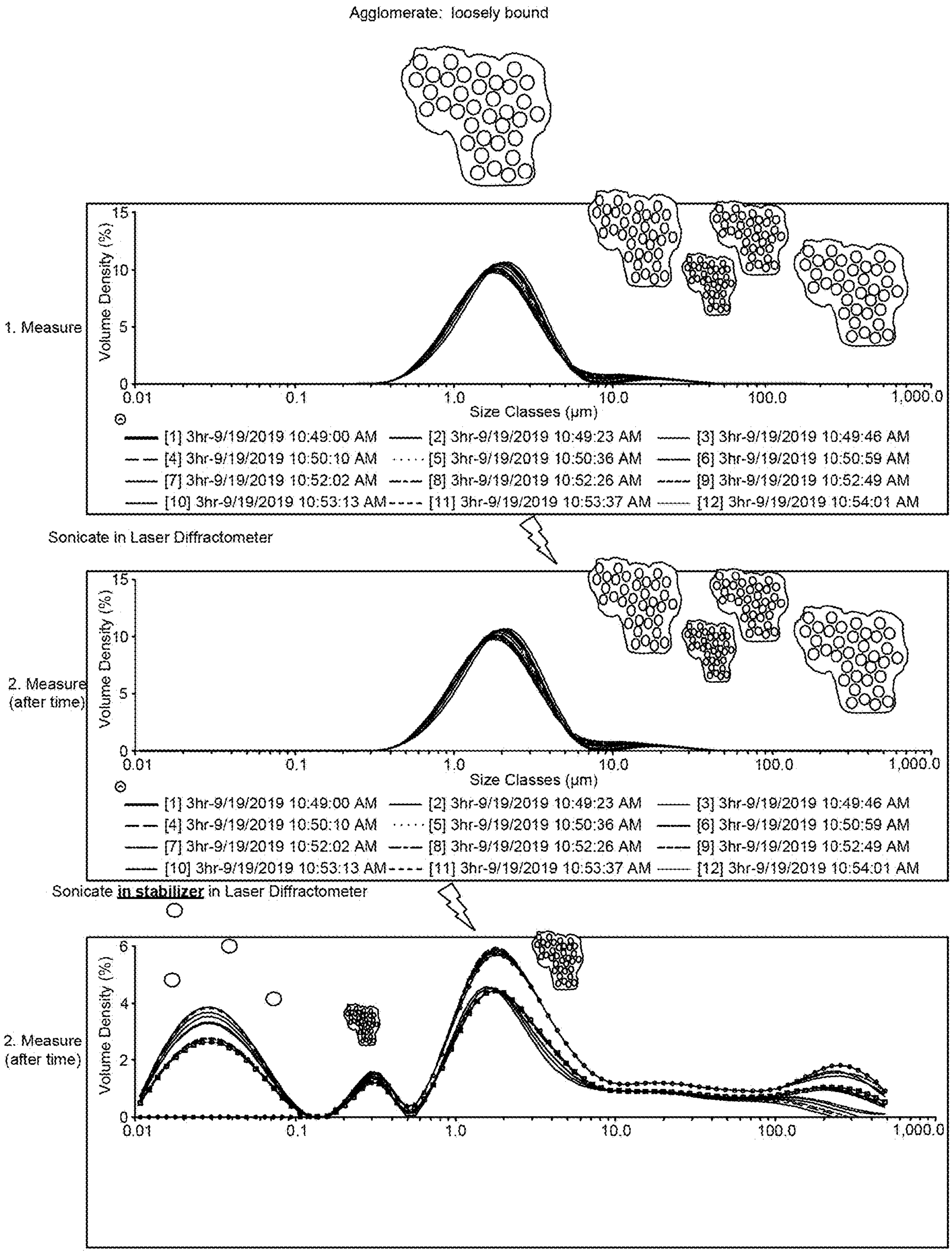

FIG. 12 describes the measurement of the size of agglomerated nanoparticles, flocculated nanoparticles, and primary (small) nanoparticles using Laser Diffractometry. Sonication breaks apart the loosely bound agglomerates of iron oxide nanoparticles. Sonication in stabilizer desirably creates primary (small) iron oxide nanoparticles. Measurements: 1. Starting point. 2. Particles flocculate to original “equilibrium” state even if they separate during sonication. 3. Sonication breaks apart loosely bound agglomerates, and stabilizer prevents flocculation which is when we start to see the small particles.

Figure 13:
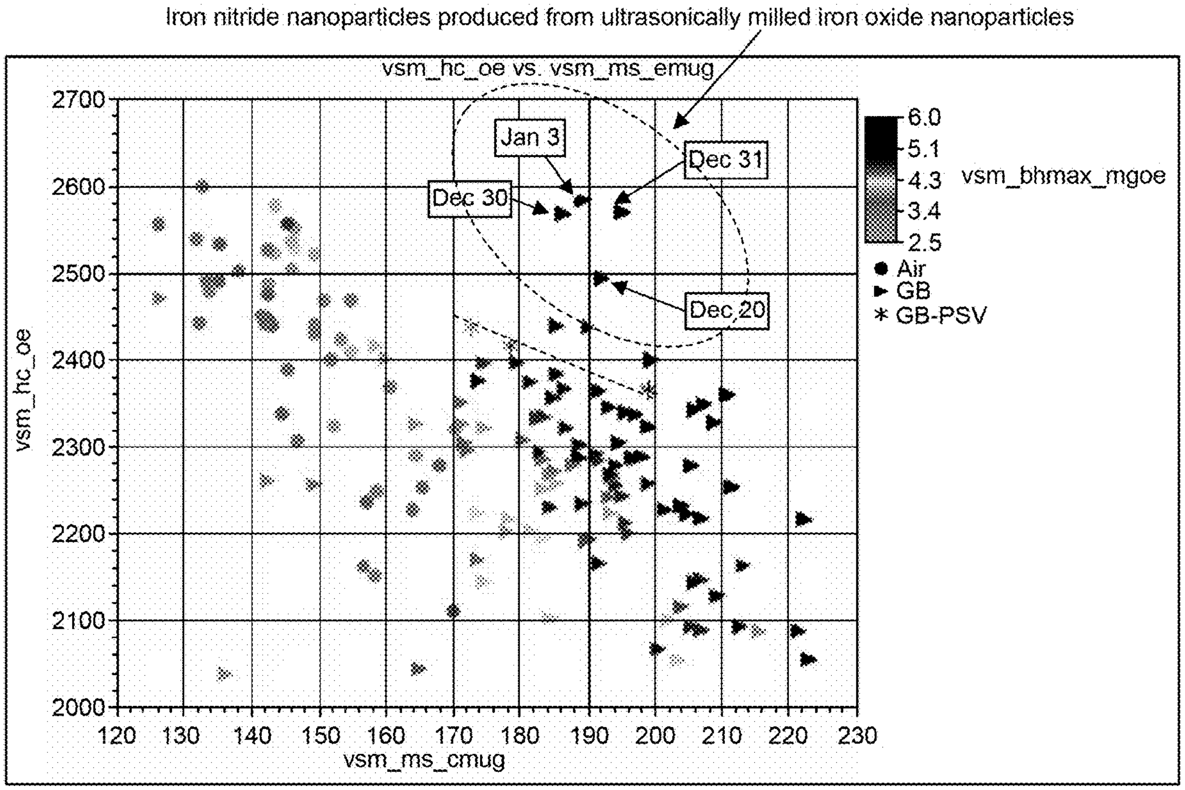
FIG. 13 shows the effects of milling on magnetic properties.

FIG. 13 shows the range of saturation magnetization and coercivity of a plurality of anisotropic iron nitride nanoparticles. The circled data points have the needed combination of Msat and Hci, i.e. MSat is >190 emu/g and Hc is greater than 2,500 Oe.

Figure 14:
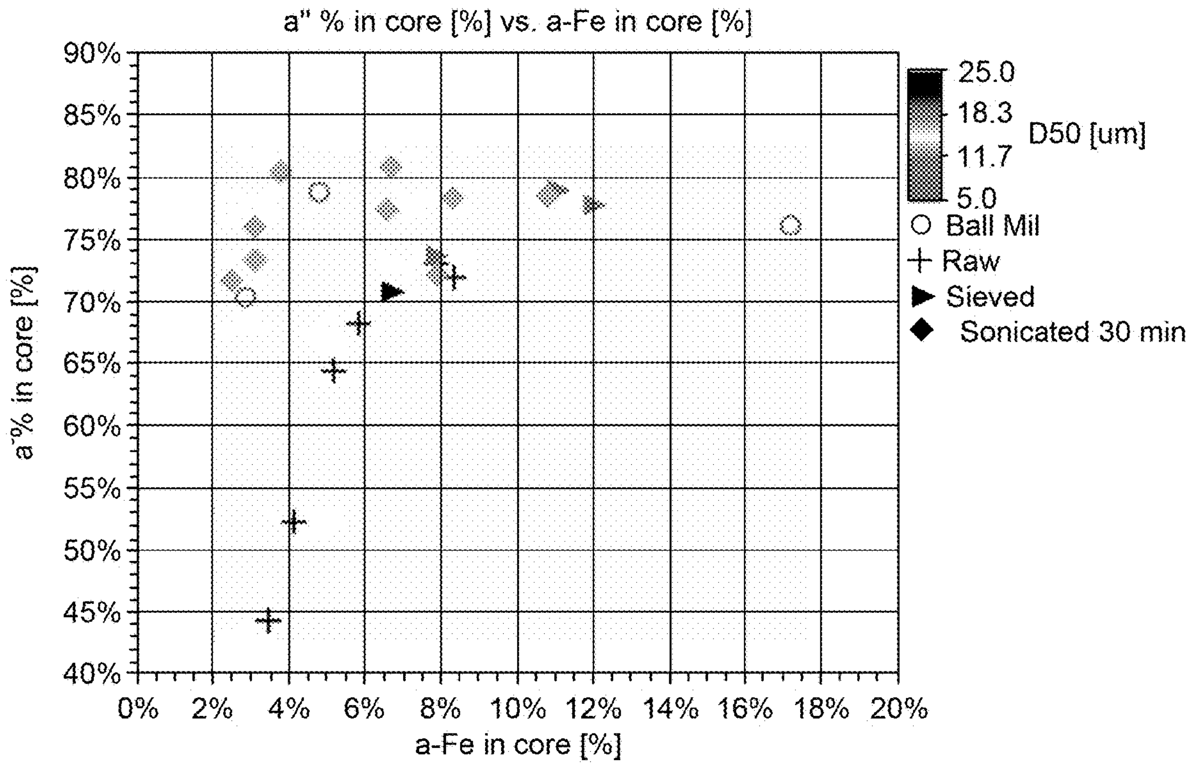
FIG. 14 shows the effect of milling phase distribution.

FIG. 14 shows the effect of milling on the alpha" % in core versus alpha-Fe % in core phase distribution in the iron nitride nanoparticles. Sonicated nanoparticles according to the methods described herein give rise to iron nitride nanoparticles having greater than 70% alpha" phase. Mössbauer spectroscopy is used to determine fraction of Fe atoms in $\alpha$-Fe, $\alpha''$-$Fe_{16}N_2$, $\varepsilon$-$Fe_{2-3}N$, and superparamagnetic Fe oxide and superparamagnetic Fe nitride phases. “$\alpha''$ in core” is calculated as Fe atoms in $\alpha''$-$Fe_{16}N_2$ phase divided by Fe atoms in all non-oxide phases. “$\alpha$-Fe in core” is calculated as Fe atoms in $\alpha$-Fe divided by Fe atoms in all non-oxide phases. Fe atoms distributed among in $\varepsilon$-$Fe_{2-3}N$ phase and oxide phase based on function derived from total fraction of atoms in superparamagnetic phases. “D50” is total volume fraction of milled iron oxide nanoparticle agglomerates with diameter less than 50 microns. Symbols denote milling method applied to iron oxide nanoparticles prior to nitriding.

The present disclosure relates at least to the following additional aspects.

Aspect 36. A method for producing iron nitride nanoparticles, comprising: carrying out a step of mechanical milling iron-containing nanoparticles, and a step of aligning the milled iron-containing nanoparticles in presence of magnetic field.

Aspect 37. The method according to Aspect 36, wherein the iron-containing nanoparticles are in a form of agglomerates of the iron-containing nanoparticles prior to the mechanical milling.

Aspect 38. The method according to Aspect 36, further comprising: carrying out a step of reducing the iron-containing nanoparticles in presence of a reducing species.

Aspect 39. The method according to Aspect 38, wherein the reducing species comprises hydrogen.

Aspect 40. The method according to Aspect 38, wherein the mechanical milling is carried out prior to the reducing step.

Aspect 41. The method according to Aspect 38, further comprising: carrying out a step of nitriding the iron-containing nanoparticles in presence of an atomic nitrogen substance to obtain iron nitride nanoparticles.

Aspect 42. The method according to Aspect 41, wherein the mechanical milling is carried out after the reducing step but before the nitriding step.

Aspect 43. The method according to Aspect 41, further comprising: carrying out after the nitriding step, a step of coating the iron-containing nanoparticles with any of carbon and boron, aluminum oxide, Copper metal, Aluminum metal, wherein the iron-containing nanoparticles comprise iron nitride nanoparticles.

Aspect 44. The method according to Aspect 43, wherein the mechanical milling is carried out after the nitriding step but before the coating step.

Aspect 45. The method according to Aspect 36, wherein the mechanical milling is carried out by any of ultrasonication in a fluid, ball milling in presence of a fluid, dry ball milling, high shear mixing in presence of a fluid, and jet milling in a high velocity gas flow.

Aspect 46. The method according to Aspect 36, further comprising: immersing a milling container in an ice bath after the mechanical milling, wherein the mechanical milling is carried out in the milling container containing the iron-containing nanoparticles.

Aspect 47. The method according to Aspect 45, wherein any of the fluids comprises water, an organic or both.

Aspect 48. The method according to Aspect 45, wherein any of the fluids comprises a surfactant to promote deagglomeration of the iron-containing nanoparticles.

Aspect 49. The method according to Aspect 45, wherein the dry ball milling is carried out in an inert atmosphere comprising any of nitrogen, argon, and helium.

Aspect 50. The method according to Aspect 43, wherein the mechanical milling is carried out after the coating step.

Aspect 51. The method according to Aspect 36, wherein the magnetically annealed iron-containing nanoparticles have D50 of 25 um or less.

Aspect 52. The method according to Aspect 36, wherein the magnetically annealed iron-containing nanoparticles have D50 of 10 um or less.

Aspect 53. The method according to Aspect 36, wherein the magnetically annealed iron-containing nanoparticles have D50 of 2.5 um or less.

Aspect 54. The method according to Aspect 36, wherein the mechanical milling is carried out in presence of magnetic medium.

Aspect 55. Agglomerates of iron nitride nanoparticles obtained by the method of Aspect 36, wherein at least one of iron nitride nanoparticles comprises α"-Fe16N2 phase domain.

Aspect 56. A plurality of anisotropic iron nitride nanoparticles, the plurality of anisotropic iron nitride nanoparticles being characterized as having a saturation magnetization, MSat, >190 emu/g and coercivity, Hc, greater than 2,500 Oe.

The plurality of anisotropic iron nitride nanoparticles of claim 18, wherein the weight percent of the α"-Fe16N2 phase is at least 70%

Aspect 57. The plurality of anisotropic iron nitride nanoparticles of Aspect 56, wherein the plurality of anisotropic iron nitride nanoparticles are further characterized as having a uniform phase composition throughout, wherein the plurality of anisotropic iron nitride nanoparticles comprises a higher mass fraction of α"-Fe16N2 phase and a lower mass fraction of α-Fe and ε-Fe2-3N phases.

Aspect 58. The plurality of anisotropic iron nitride nanoparticles of Aspect 57, wherein the weight percent of the α"-Fe16N2 phase is at least 70%, at least 75%, or at least 80%.

Aspect 59. The plurality of anisotropic iron nitride nanoparticles of Aspect 56, wherein the iron nitride nanoparticles are coated with one or more of carbon, boron, aluminum oxide, copper metal, or aluminum metal.

Aspect 60. A permanent magnet, comprising a plurality of iron nitride nanoparticles, the permanent magnet being characterized as having a saturation magnetization, MS at, in the range of from about 12.5 to about 14 kG.

Aspect 61. The permanent magnet of Aspect 60, wherein the iron nitride nanoparticles are magnetically aligned and bonded in a matrix.

Aspect 62. The permanent magnet of Aspect 60, wherein the nanoparticles are further characterized as having a uniform phase composition throughout, wherein the nanoparticles comprises a higher mass fraction of the preferred α"-Fe16N2 phase and a lower mass fraction of α-Fe and ε-Fe2-3N phases.

Aspect 63. The permanent magnet of Aspect 62, wherein the weight percent of the α"-Fe16N2 phase is at least 70%, 75%, 80%.

Aspect 64. The permanent magnet of Aspect 60, wherein the iron nitride nanoparticles are coated with one or more of carbon, boron, aluminum oxide, copper metal, or aluminum metal.

Aspect 65. The permanent magnet of Aspect 60, wherein at least a portion of the iron nitride nanoparticles are characterized as being deagglomerated discrete primary particles.

Various examples have been described. These and other examples are within the scope of the following claims.

When ranges are used herein for physical properties, such as molecular weight, or chemical properties, such as chemical formulae, all combinations, and sub-combinations of ranges for specific embodiments therein are intended to be included.

The disclosures of each patent, patent application, and publication cited or described in this document are hereby incorporated herein by reference, in its entirety.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

The above description is intended to be illustrative, and not restrictive. For example, the above-described examples (or one or more aspects thereof) may be used in combination with each other. Other aspects can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description as examples or aspects, with each claim standing on its own as a separate aspect, and it is contemplated that such aspects can be combined with each other in various combinations or permutations. The scope of the disclosure should be determined with reference to the appended claims, along with the full scope of equivalents to which such claims are entitled.

What is claimed is:

1. A permanent magnet formed according to the method comprising:

annealing an iron-containing agglomerated powder in the presence of nitrogen to provide iron nitride nanoparticles;

dispersing the iron nitride nanoparticles in a fluid;

removing excess fluid;

combining the iron nitride nanoparticles with a binder composition to provide a nanoparticle binder mixture;

aligning the nanoparticle binder mixture with an external force, and curing the nanoparticle binder mixture to form the permanent magnet;

wherein the permanent magnet exhibits a squareness measured in a parallel direction that is larger than a squareness observed in a perpendicular direction to the direction of alignment of the nanoparticles, and wherein the permanent magnetic exhibits an X-ray diffraction pattern having a relative intensity of an α"-$Fe_{16}N_2$ (004) peak that is greater than the intensity of the most-intense α"-$Fe_{16}N_2$ (202) peak in a diffraction pattern, where the diffraction vector is parallel to the alignment direction.

2. The permanent magnet of claim 1, wherein the iron nitride nanoparticles have an intrinsic coercivity from 2,000 to 4,000 Oe.

3. The permanent magnet of claim 1, wherein the iron nitride nanoparticles have an intrinsic coercivity from 2,500 to 4,000 Oe.

4. The permanent magnet of claim 1, wherein the iron nitride nanoparticles have an intrinsic coercivity from 3,000 Oe to 4,000 Oe.

5. The permanent magnet of claim 1, wherein the fluid is aqueous.

6. The permanent magnet of claim 1, wherein the step of dispersing the iron nitride nanoparticles in a fluid includes: introducing the iron nitride nanoparticles to a mixture of water and one or more additives to provide an aqueous solution; and subjecting the aqueous solution to a process of ultrasonication and/or wet ball milling.

7. The permanent magnet of claim 6, wherein the one or more additives comprises a dispersing agent, a stabilizer, a wetting agent, a surfactant, a viscosity modifier, a corrosion inhibitor, emulsifier or any combination thereof.

8. The permanent magnet of claim 1, wherein the fluid is non-aqueous.

9. The permanent magnet of claim 1, wherein after the step of removing excess fluid the iron nitride nanoparticles are dried by freeze drying, spray drying, debinding, solvent exchange, or any combination thereof.

10. The permanent magnet of claim 1, wherein the external force is a magnetic field.

11. A permanent magnet formed according to the method comprising:

annealing an iron-containing agglomerated powder in the presence of nitrogen to provide iron nitride nanoparticles;

dispersing the iron nitride nanoparticles in a fluid;

removing excess fluid;

combining the iron nitride nanoparticles with a binder composition to provide a nanoparticle binder mixture;

aligning the nanoparticle binder mixture with an external force, and curing the nanoparticle binder mixture to form the permanent magnet;

wherein a ratio of integrated intensities of an α"-$Fe_{16}N_2$ (004) x-ray diffraction peak to an α"-$Fe_{16}N_2$ (202) x-ray diffraction peak for the iron nitride nanoparticles is greater than at least 0.07%, where the diffraction vector is parallel to alignment direction.

12. The permanent magnet of claim 11, wherein the iron nitride nanoparticles have an intrinsic coercivity from 2,000 to 4,000 Oe.

13. The permanent magnet of claim 11, wherein the iron nitride nanoparticles have an intrinsic coercivity from 2,500 to 4,000 Oe.

14. The permanent magnet of claim 11, wherein the iron nitride nanoparticles have an intrinsic coercivity from 3,000 Oe to 4,000 Oe.

15. The permanent magnet of claim 11, wherein the fluid is aqueous.

16. The permanent magnet of claim 11, wherein the step of dispersing the iron nitride nanoparticles in a fluid includes: introducing the iron nitride nanoparticles to a mixture of water and one or more additives to provide an aqueous solution; and subjecting the aqueous solution to a process of ultrasonication and/or wet ball milling.

17. The permanent magnet of claim 16, wherein the one or more additives comprises a dispersing agent, a stabilizer, a wetting agent, a surfactant, a viscosity modifier, a corrosion inhibitor, emulsifier or any combination thereof.

18. The permanent magnet of claim 11, wherein the fluid is non-aqueous.

19. The permanent magnet of claim 11, wherein after the step of removing excess fluid the iron nitride nanoparticles are dried by freeze drying, spray drying, debinding, solvent exchange, or any combination thereof.

20. The permanent magnet of claim 11, wherein the external force is a magnetic field.

* * * * *